US010498432B2

(12) United States Patent
Kim et al.

(10) Patent No.: US 10,498,432 B2
(45) Date of Patent: Dec. 3, 2019

(54) METHOD AND APPARATUS FOR DECODING SIGNAL IN WIRELESS COMMUNICATION SYSTEM

(71) Applicant: Samsung Electronics Co., Ltd, Gyeonggi-do (KR)

(72) Inventors: Kwang Taik Kim, Gyeonggi-do (KR); Sung Hoon Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 15/399,605

(22) Filed: Jan. 5, 2017

(65) Prior Publication Data

US 2017/0195014 A1 Jul. 6, 2017

(30) Foreign Application Priority Data

Jan. 5, 2016 (KR) .................. 10-2016-0000954

(51) Int. Cl.
*H04B 7/155* (2006.01)
*H04W 40/22* (2009.01)
(Continued)

(52) U.S. Cl.
CPC ....... *H04B 7/15592* (2013.01); *H04B 7/0413* (2013.01); *H04L 5/0007* (2013.01); *H04W 40/22* (2013.01); *H04W 72/044* (2013.01); *H04W 88/04* (2013.01); *H04W 88/02* (2013.01); *H04W 88/08* (2013.01)

(58) Field of Classification Search
CPC ............. H04W 48/12; H04W 72/0406; H04W 72/1278; H04W 74/002; H04W 40/22; H04W 52/46; H04W 88/04; H04B 7/15592
See application file for complete search history.

(56) References Cited

U.S. PATENT DOCUMENTS 8,363,747 B2 1/2013 Liu et al.
2008/0049718 A1* 2/2008 Chindapol ......... H04B 7/15592
370/351
(Continued)

OTHER PUBLICATIONS

Ahmed El-Mahdy et al., Log-Likelihood Ratio-based Relay Selection Algorithm for Cooperative Communications, 2015, p. 1 (Year: 2015).*
(Continued)

*Primary Examiner* — Ashley Shivers

(57) ABSTRACT

The present disclosure relates to a pre-5th-Generation (5G) or 5G communication system to be provided for supporting higher data rates beyond 4th-Generation (4G) communication system such as long term evolution (LTE). According to the present disclosure, an method of a receiving end in a wireless communication system includes: receiving network information from a transmitting end; acquiring received signals into which first signals transmitted by the transmitting end for predetermined blocks based on the network information and second signals relayed by a relay end are combined; configuring an expanded graph according to the trajectories of the first signals and the second signals; and restoring a message from the received signals by decoding the received signals according to the expanded graph.

12 Claims, 15 Drawing Sheets

(51) Int. Cl.
*H04W 88/04* (2009.01)
*H04B 7/0413* (2017.01)
*H04L 5/00* (2006.01)
*H04W 72/04* (2009.01)
*H04W 88/02* (2009.01)
*H04W 88/08* (2009.01)

(56) References Cited

U.S. PATENT DOCUMENTS

| | | | |
|---|---|---|---|
| 2010/0261426 A1* | 10/2010 | Shin | H04B 7/15521 455/9 |
| 2015/0172002 A1* | 6/2015 | Yu | H04L 1/0076 375/341 |
| 2016/0294513 A1* | 10/2016 | Wager | H04W 72/1289 |
| 2017/0141796 A1* | 5/2017 | Koike-Akino | H03M 13/1111 |
| 2017/0155472 A1* | 6/2017 | Mohamad | H04B 7/15592 |
| 2018/0184269 A1* | 6/2018 | Christoval | H04W 4/38 |

OTHER PUBLICATIONS

Wassim Alexan et al., Relay Selection Based on the Log Likelihood Ratio for Cooperative Communication Networks, 2014, IEEE, p. 1 (Year: 2014).*

* cited by examiner

METHOD AND APPARATUS FOR DECODING SIGNAL IN WIRELESS COMMUNICATION SYSTEM

CROSS-REFERENCE TO RELATED APPLICATION(S) AND CLAIM OF PRIORITY

The present application is related to and claims the priority under 35 U.S.C. § 119(a) to Korean Application Ser. No. 10-2016-0000954, which was filed in the Korean Intellectual Property Office on Jan. 5, 2016, the entire content of which is hereby incorporated by reference.

TECHNICAL FIELD

The present disclosure relates to a method and an apparatus for decoding a signal in a wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

There are two types of relay end networks in a wireless communication system. First, a layered network is a network that can decode one transmission packet for each reception block. In the case of the layered network, a receiving end performs graph-based simultaneous decoding for the entire trajectory of a received signal. In the simultaneous decoding, the receiving end performs MAP decoding in consideration of codes and observation components that are used by a transmitting end, a relay end, and a receiving end. The receiving end forms an entire factor graph in order to perform the MAP decoding. Second, a non-layered network is a network in which one reception block receives several pieces of packet information intermingled with one another. In the case of the non-layered network, a receiving end performs sequential decoding. The receiving end restores a received message by performing successive cancellation decoding and then bringing interference into noise in consideration of signals received through a relay end.

When the receiving end performs sequential decoding, the receiving end sequentially performs two-phase reception operations and thus loses information in each decoding step. The sequential decoding has a problem in that performance is degraded on account of the loss of information. When the receiving end performs simultaneous decoding, the receiving end performs decoding on all transmission blocks of the entire network. Since the receiving end performs the decoding on all the transmission blocks, complexity increases, and a delay in the reception of a signal happens. Namely, the sequential decoding has a problem of performance degradation caused by the loss of information. In addition, the simultaneous decoding has a problem in that the reception of a signal by means of a receiver is delayed.

SUMMARY

To address the above-discussed deficiencies, it is a primary object to provide a method and an apparatus for decoding a signal in a wireless communication system.

One embodiment provides a method and an apparatus for configuring an expanded graph according to the trajectories of signals received from a transmitting end and a relay end in a wireless communication system.

Another embodiment provides a method and an apparatus for partly decoding a received signal according to an expanded graph in a wireless communication system.

Yet another embodiment provides a method and an apparatus for updating a log likelihood ratio (LLR) value for a received signal according to an expanded graph in a wireless communication system.

According to an embodiment of the present disclosure, an method of a receiving end in a wireless communication system, the method comprises receiving network information from a transmitting end, acquiring received signals into which first signals transmitted by the transmitting end for predetermined blocks based on the network information and second signals relayed by a relay end are combined, configuring an expanded graph according to the trajectories of the first signals and the second signals, and restoring a message from the received signals by decoding the received signals according to the expanded graph.

According to another embodiment of the present disclosure, an method of a transmitting end in a wireless communication system, the method comprises transmitting network information and resource allocation information to a receiving end and a relay end to provide a relay service, transmitting a signal to the receiving end and the relay end. Herein, the network information comprises information of network elements located within the cell of the transmitting end and is used by the receiving end to configure an expanded graph for decoding the signal.

According to another embodiment of the present disclosure, an method of a relay end in a wireless communication system, the method comprises receiving network information and resource allocation information from a transmitting end, receiving a signal from the transmitting end, and relaying the signal to a receiving end. Herein, the network information comprises information of network elements located within the cell of the transmitting end and is used by the receiving end to configure an expanded graph for decoding the signal.

According to another embodiment of the present disclosure, a receiving end in a wireless communication system, the receiving end comprises a communication interface configured to receive network information from a transmitting end and to acquire received signals into which first signals transmitted by the transmitting end for predetermined blocks and second signals relayed by a relay end are combined, and a controller configured to configure an expanded graph according to the trajectories of the first signals and the second signals and to restore a message from the received signals by decoding the received signals according to the expanded graph.

According to another embodiment of the present disclosure, a transmitting end in a wireless communication system, the transmitting end comprises a communication interface configured to transmit network information and resource allocation information to a receiving end and a relay end to provide a relay service and to transmit a signal to the receiving end and the relay end. Herein the network information comprises information of network elements located within the cell of the transmitting end and is used by the receiving end to configure an expanded graph for decoding the signal.

According to another embodiment of the present disclosure, a relay end in a wireless communication system, the relay end comprises a communication interface configured to receive network information and resource allocation information from a transmitting end, to receive a signal from the transmitting end, and to relay the signal to a receiving end. Herein the network information comprises information of network elements located within the cell of the transmitting end and is used by the receiving end to configure an expanded graph for decoding the signal.

According to the present disclosure, it is possible to increase the accuracy of decoding and to reduce the time required for decoding in a wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Hereinafter, the present disclosure illustrates a technology for transmitting and receiving data in a wireless communication system. In particular, the present disclosure illustrates various embodiments in which a receiving end in a wireless communication system restores a message from received signals by receiving the signals from a transmitting end and a relay end for predetermined blocks, configuring an expanded graph according to the trajectories of the received signals, and performing decoding according to the configured expanded graph.

Terms referring to control information, terms referring to network entities, terms (for example, a message) referring to data, terms referring to elements of a device, terms referring to graphs, terms referring to signals, etc., as used herein, are illustrated for the convenience of description. Accordingly, the present disclosure is not limited to terms to be described below, and other terms having equivalent technical meanings may be used.

Figure 1:
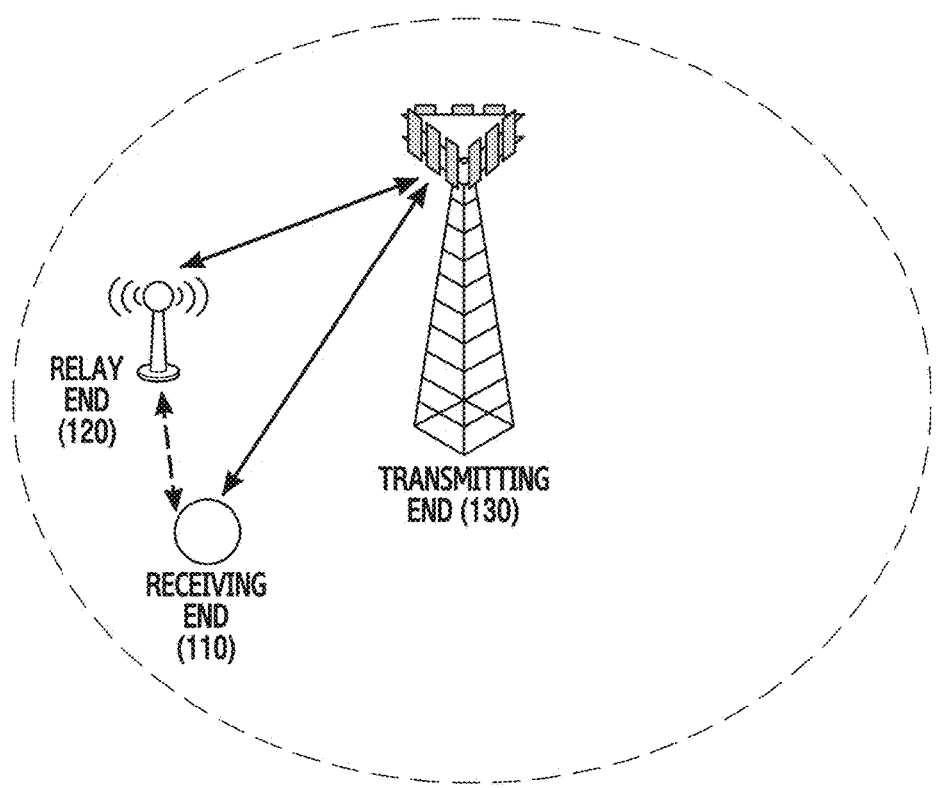
FIG. 1 illustrates the configuration of a wireless communication system according to one embodiment.

FIG. 1 illustrates a wireless communication system according to one embodiment of the present disclosure. FIG. 1 exemplifies an environment of the wireless communication system in which a receiving end, a relay and, and a transmitting end are located.

Referring to FIG. 1, the transmitting end 130 forms a cell to transmit and receive a signal. The relay end 120 and the receiving end 110 are located within the cell. The transmitting end 130 may provide a communication service to the relay end 120 and the receiving end 110. For example, the transmitting end 130 may be a macro base station, and the relay end 120 may be a small base station. The receiving end 110 may be a terminal device.

The transmitting end 130 transmits signals to the relay end 120 and the receiving end 110 and receives signals from the relay end 120 and the receiving end 110. When the transmitting end 130 transmits signals to the relay end 120 and the receiving end 110, the receiving end 110 performs downlink communication. Furthermore, the receiving end 110 may transmit a channel quality indicator (CQI) to the transmitting end 130. The channel quality indicator indicates the channel state between the transmitting end 130 and the receiving end 110. The channel quality indicator, which is information representing the quality of the channels between nodes performing communication, may include at least one of a carrier to interference plus noise ratio (CINR), a carrier to noise (CNR), a signal to interference plus noise ratio (SINR), a signal to noise ratio (SNR), and the like.

The transmitting end 130 encodes a signal to be transmitted, and the relay end 120 decodes the received signal and encodes a signal to be transmitted. The receiving end 110 may decode the received signal to detect a message that the transmitting end 130 tries to transmit. The relay end 120 receives a signal from at least one previous hop and generates a signal to be transmitted to the next hop on the basis of the received signal. Herein, the previous hop refers to the transmitting end 130 or another relay end. For this purpose, the relay end 120 may use a distributed decode forward (DDF) technique that is a channel coding technique that makes joint decoding possible in the next hop. The DDF includes network conversion coding. Namely, the DDF assumes the original network to be another virtual network and performs encoding and decoding in the converted virtual network. Through this process, outputs of network nodes are converted into (i.e., decoded to) predefined outputs. Accordingly, the outputs of the network nodes can be predicted so that the original network can be treated as a deterministic network from the perspective of the transmitting end 130. For example, the relay end 120 may forward a message to a final destination using a partial decode-forward technique, a compress-forward technique, etc.

The receiving end 110 may receive signals transmitted by the transmitting end 130 for predetermined blocks and signals relayed by the relay end 120 and may configure an expanded graph according to the trajectories of the received signals. Herein, the block refers to a circuitry that distinguishes between intervals during which at least one signal is received by the receiving end 110, and the receiving end 110 may receive one signal from at least one entity (for example, the relay end 120 or the transmitting end 130) for one block. Namely, the block specifies the time point when the receiving end 110 receives a signal or specifies a signal received by the receiving end 110. For example, the expanded graph may be referred to as an expanded graph network. According to the expanded graph, the receiving end 110 may decode the received signals into which the signals transmitted by the transmitting end 130 and the signals relayed by the relay end 120 are combined. For example, the expanded graph may be a route along which the receiving end 110 performs decoding. The receiving end 110 may perform joint sliding window decoding according to the configured expanded graph. The predetermined blocks are included in one window. The transmitting end 130 and the relay end 120 transmit different signals for each block. For example, the transmitting end 130 transmits signal m to the receiving end 110 and the relay end 120 for a first block. The relay end 120 receives signal m from the transmitting end 130 and does not transmit a signal to the receiving end 110. The receiving end 110 receives signal m from the transmitting end 130 and does not receive a signal from the relay end 120. The transmitting end 130 transmits signal n to the receiving end 110 and the relay end 120 for a second block. The relay end 120 receives signal n from the transmitting end 130 and relays signal m to the receiving end 110. The receiving end 110 receives signal n from the transmitting end 130 and receives signal m from the relay end 120. Namely, the receiving end 110 receives the different signals from the transmitting end 130 and the relay end 120 for the second block.

FIG. 1 exemplifies a situation in which the transmitting end 130 performs downlink communication while serving as a base station. However, various embodiments may also be applied to uplink communication. In this case, a base station may serve as a receiving end, and a terminal may serve as a transmitting end. Namely, the operations of the transmitting end 130 and the receiving end 110 may be replaced by each other. Hereinafter, for the convenience of description, downlink communication will be described as an example in the present disclosure.

However, as described above, embodiments to be described below may also be similarly applied to uplink communication.

Figure 2:
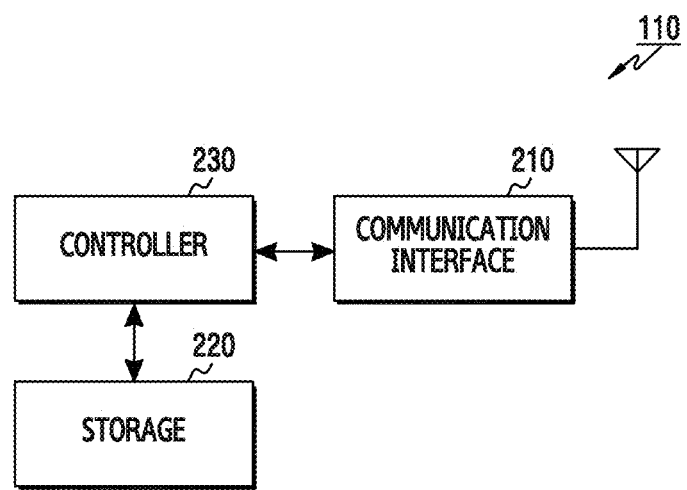
FIG. 2 illustrates a block diagram of a receiving end in a wireless communication system according to one embodiment of the present disclosure.

FIG. 2 illustrates a block diagram of a receiving end in a wireless communication system according to one embodiment of the present disclosure. FIG. 2 exemplifies elements of the receiving end 110 in the wireless communication system. In various embodiments, the receiving end 110 may be a portable electronic device, and may be one of a smart phone, a portable terminal, a mobile phone, a mobile pad, a media player, a tablet computer, a handheld computer, and a personal digital assistant (PDA). Furthermore, the receiving end 110 may be a device that implements the functions of two or more of the aforementioned devices.

Terms, such as "unit", "device", etc., as used herein, refer to a unit for processing at least one function or operation, and the unit may be implemented by hardware, software, or a combination thereof. Referring to FIG. 2, the receiving end 110 includes a communication interface 210, a storage 220, and a controller 230.

The communication interface 210 performs a function for transmitting and receiving signals through a wireless channel. For example, the communication interface 210 performs a function of conversion between a baseband signal and a bit stream according to a physical layer standard of the system. For example, the communication interface 210 generates complex symbols by encoding and modulating a transmission bit stream when transmitting data. Furthermore, the communication interface 210 restores a reception bit stream by demodulating and decoding a baseband signal when receiving data. The communication interface 210 may be referred to as the transceiver. The communication interface 210 includes a transmitter and a receiver. For example, the communication interface 210 may include a transmission filter, a reception filter, an amplifier, a mixer, an oscillator, a digital-to-analog converter (DAC), an analog-to-digital converter (ADC), etc.

According to one embodiment, the communication interface 210 transmits channel quality information to the transmitting end 130. The channel quality information includes channel quality information between the receiving end 110 and the transmitting end 130 and channel quality information between the receiving end 110 and the relay end 120.

According to one embodiment, the communication interface 210 receives, from the transmitting end 130, network information containing information on the transmitting end 130 and the relay end 120 and resource allocation information. For example, the resource allocation information includes control information. The communication interface 210 receives signals from the transmitting end 130 and the relay end 120. For example, the signals received from the transmitting end 130 and the relay end 120 may be combined received signals. For example, the communication interface 210 acquires received signals into which first signals transmitted by the transmitting end 130 for predetermined blocks and second signals relayed by the relay end 120 are combined. For example, the communication interface 210 may receive signals from the transmitting end 130 and a plurality of relay ends for predetermined blocks.

The storage 220 stores data, such as a basic program, an application program, and setup information, for the operation of the receiving end 110. In particular, the storage 220 may store a code book for feedback of channel information.

According to one embodiment, the storage 220 may store network information received from the transmitting end 130. The storage 220 stores information on an expanded graph that is mapped with the trajectories of the first signals transmitted by the transmitting end 130 and the second signals transmitted by the relay end 120.

According to one embodiment, the storage 220 stores channel quality information. The channel quality information includes channel quality information between the receiving end 110 and the transmitting end 130 and channel quality information between the receiving end 110 and the relay end 120.

According to one embodiment, the storage 220 stores information associated with a low density parity check (LDPC) code, a turbo code, a repeat accumulate (RA) code, and a low density generator matrix (LDGM) code.

The controller 230 controls overall operations of the receiving end. For example, the controller 230 transmits and receives signals through the communication interface 210. Furthermore, the controller 230 records data in the storage 220 and reads the data from the storage 220. For this purpose, the controller 230 may include at least one processor. For example, the controller 230 may include a communication processor (CP) that performs control for communication and an application processor (AP) that controls an upper layer, such as an application program, etc.

According to one embodiment, the controller 230 configures an expanded graph according to the trajectories of signals received from the transmitting end 130 and the relay end 120 for predetermined blocks. The expanded graph is a virtual network configured by the receiving end 110. For example, the controller 230 restores a message from the received signals by repeatedly decoding the received signals according to the expanded graph.

According to one embodiment, the controller 230 determines whether the message has been completely restored from the received signals. When determining that the message has been completely restored from the received signals, the controller 230 moves to the next predetermined blocks, receives signals from the transmitting end 130 and the relay end 120 for the next predetermined blocks, and configures an expanded graph according to the trajectories of the received signals. The expanded graph includes a node set corresponding to the receiving end 110, a node set corresponding to the relay end 120, a node set corresponding to the transmitting end 130, a check node corresponding to the receiving end 110, and a check node corresponding to the relay end 120.

According to one embodiment, the controller 230 determines the number of predetermined blocks corresponding to a window. For example, in a case where the number of blocks relevant to the window increases, the accuracy of decoding the received signals increases. In contrast, in a case where the number of blocks relevant to the window increases, the decoding time for the received signals increases.

According to one embodiment, the controller 230 updates a log likelihood ratio (LLR) value using the previously received signal at the node set corresponding to the receiving end 110 in the expanded graph and the signal relayed by the relay end, and forwards the updated LLR value to the node set corresponding to the transmitting end 130 in the expanded graph through message passing.

According to one embodiment, the controller 230 performs a sum-product algorithm (SPA) on the updated LLR value at the node set corresponding to the transmitting end 130 in the expanded graph and forwards the result obtained by performing the sum-product algorithm to the check node of the relay end of the next block in the expanded graph through message passing.

According to one embodiment, the controller 230 converts the LLR value at the check node corresponding to the relay end and forwards the converted LLR value to the node set corresponding to the relay end of the next block in the expanded graph through message passing.

According to one embodiment, the controller 230 performs a sum-product algorithm on the converted LLR value at the node set corresponding to the relay end of the next block in the expanded graph and forwards the result obtained by performing the sum-product algorithm to the check node of the receiving end of the next block in the expanded graph through message passing.

According to one embodiment, the controller 230 updates the LLR value at the node set corresponding to the receiving end of the next block in the expanded graph and restores the message.

According to one embodiment, the controller 230 performs graph-based joint sliding window decoding. The controller 230 may repeat the operation of updating the LLR value until a condition for repetition is satisfied.

For example, the controller 230 may control the receiving end 110 to perform the procedures illustrated in FIGS. 5, 6, 9, 12, 14, and 15.

Figure 3:
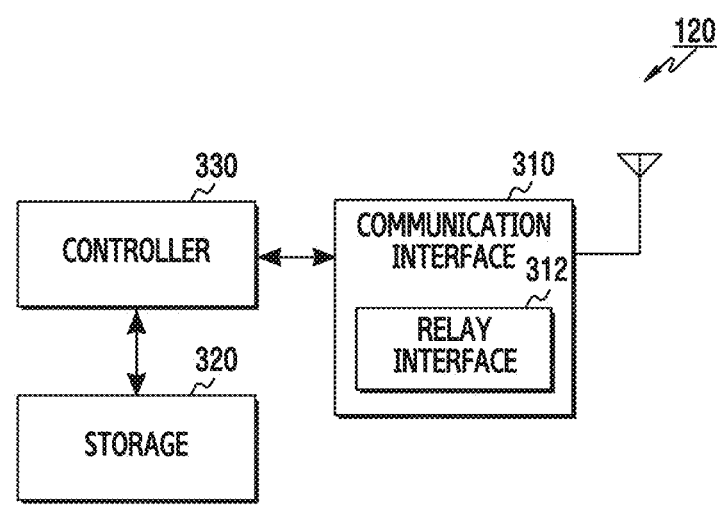
FIG. 3 illustrates a block diagram of a relay end in a wireless communication system according to one embodiment of the present disclosure.

FIG. 3 illustrates a block diagram of a relay end in a wireless communication system according to one embodiment of the present disclosure. FIG. 3 exemplifies the configuration of the relay end in the wireless communication system. Terms, such as "unit", "device", etc., as used herein, refer to a unit for processing at least one function or operation, and the unit may be implemented by hardware, software, or a combination thereof.

Referring to FIG. 3, the relay end 120 includes a communication interface 310, a relay interface 312, a storage unit 320, and a controller 330. The communication interface 310 includes the relay interface 312. The communication interface 310 performs functions for transmitting and receiving signals through a wireless channel. The relay interface 312 decodes and encodes, through the controller 330, a signal received from the transmitting end 130 and relays the same to the receiving end 110. For example, the communication interface 310 performs a function of conversion between a baseband signal and a bit stream according to a physical layer standard of the system. For example, the communication interface 310 generates complex symbols by encoding and modulating a transmission bit stream when transmitting data. Furthermore, the communication interface 310 restores a reception bit stream by demodulating and decoding a baseband signal when receiving data. In addition, the communication interface 310 subjects a baseband signal to up-conversion to a radio frequency (RF) band signal to transmit the RF band signal through an antenna and subjects an RF band signal received through the antenna to down-conversion to a baseband signal. For example, the communication interface 310 may include a transmission filter, a reception filter, an amplifier, a mixer, an oscillator, a DAC, an ADC, etc. Furthermore, the communication interface 310 may include a plurality of RF chains. In addition, the communication interface 310 may perform beamforming. For the beamforming, the communication interface 310 may adjust the phases and magnitudes of signals that are transmitted and received through a plurality of antennas or antenna elements. The communication interface 310 transmits and receives signals as described above. Accordingly, the communication interface 310 may be referred to as a transmitter, a receiver, or a transceiver. The communication interface 310 operates under the control of the controller 330.

According to one embodiment, the communication interface 310 transmits channel quality information to the transmitting end 130. The channel quality information represents the channel state between the transmitting end 130 and the relay end 120. The communication interface 310 receives network information and resource allocation information.

According to one embodiment, the communication interface 310 transmits determined signals according to the number of blocks determined by the controller 330. For example, the determined signals are signals recognized by the transmitting end 130 and the receiving end 110 while the relay end 120 does not receive a signal from the transmitting end 130. According to one embodiment, the communication interface 310 relays, to the receiving end 110, second signals received from the transmitting end 130 for predetermined blocks. For example, the relay end 120 may further include a backhaul communication interface. The backhaul communication interface provides an interface for communicating with other nodes within a network. Namely, the backhaul communication interface coverts bit streams transmitted to the other nodes (for example, other transmitting ends, control nodes, core networks, etc.) from the relay end 120 into physical signals and converts physical signals received from the other nodes into bit streams. For example, the backhaul communication interface transmits and receives data with other transmitting ends. The backhaul communication interface performs backhaul communication with the transmitting end 130.

The storage 320 stores data, such as a basic program, an application program, and setup information, for the operation of the transmitting end. In particular, the storage 320 may store a code book for beamforming of data signals. Further, the storage 320 provides the stored data in response to a request of the controller 330. According to one embodiment, the storage 320 may store LLR values of a function signal.

The controller 330 controls overall operations of the relay end 120. For example, the controller 330 transmits and receives signals through the communication interface 310. Furthermore, the controller 330 records data in the storage 320 and reads the data from the storage 320. For this purpose, the controller 330 may include at least one processor. According to one embodiment, the controller 330 decodes a signal received from the transmitting end 130. The controller 330 calculates LLR values for symbols of the received signal, stores the calculated LLR values in the storage 320, and performs joint block decoding on the basis of the LLR values. The controller 330 detects bit LLR values of the transmitting end 130. For example, the controller 330 may receive an updated LLR value from the receiving end 110 through the communication interface 310. The controller 330 may update the LLR values stored in the storage 320. The controller 330 may repeat the operation of updating the LLR values until a condition for repetition is satisfied.

Figure 5:
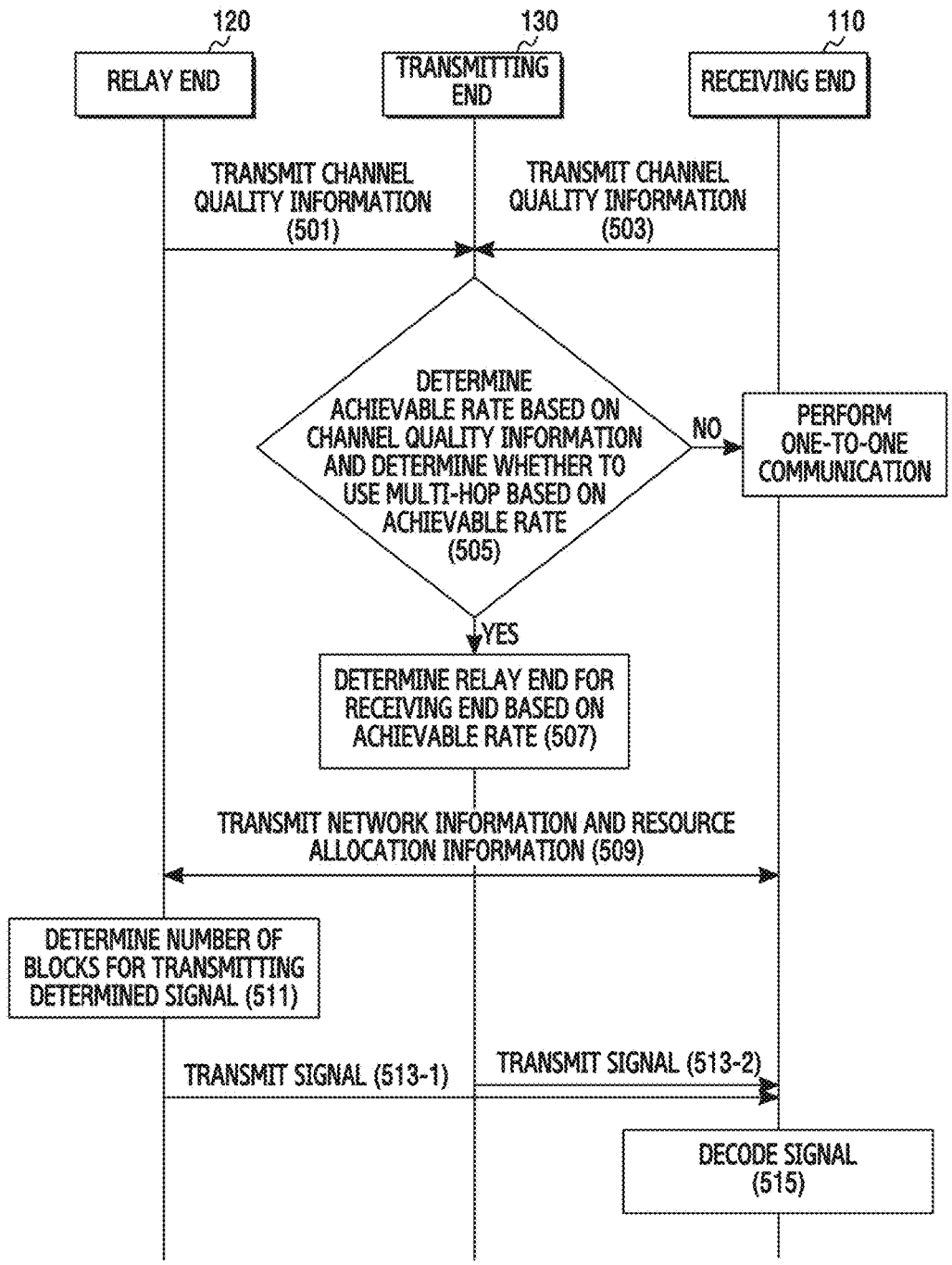
FIG. 5 illustrates a procedure of a transmission and reception in a receiving end, a relay end, and a transmitting end in a wireless communication system according to one embodiment of the present disclosure.

For example, the controller 330 may control the relay end 120 to perform the procedure illustrated in FIG. 5, etc.

Figure 4:
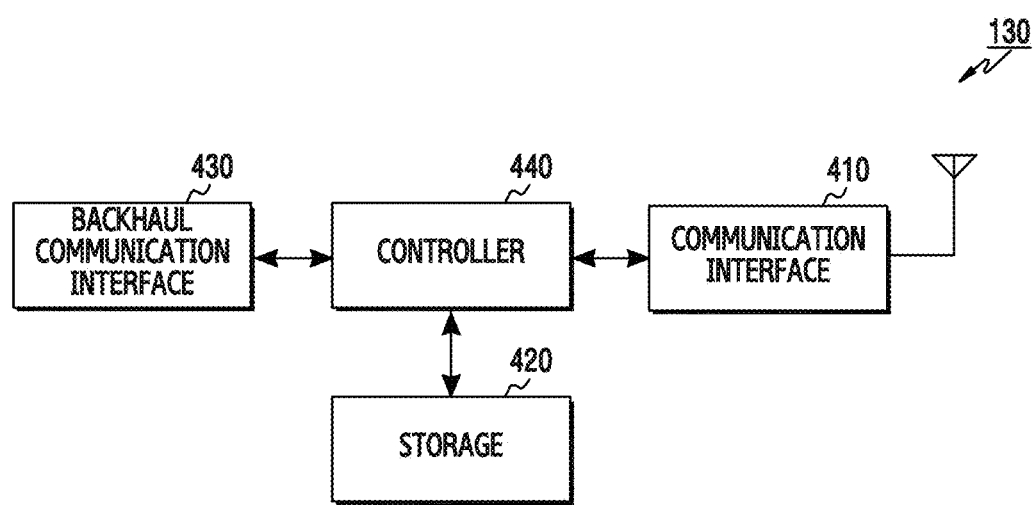
FIG. 4 illustrates a block diagram of a transmitting end in a wireless communication system according to one embodiment of the present disclosure.

FIG. 4 illustrates a block diagram of a transmitting end in a wireless communication system according to one embodiment. FIG. 4 exemplifies the configuration of the transmitting end 130. Terms, such as "unit", "device", etc., as used herein, refer to a unit for processing at least one function or operation, and the unit may be implemented by hardware, software, or a combination thereof.

Referring to FIG. 4, the transmitting end includes a communication interface 410, a storage 420, a backhaul communication interface 430, and a controller 440.

The communication interface 410 performs functions for transmitting and receiving signals through a wireless channel. For example, the communication interface 410 performs a function of conversion between a baseband signal and a bit stream according to a physical layer standard of the system. For example, the communication interface 410 generates complex symbols by encoding and modulating a transmission bit stream when transmitting data. Furthermore, the communication interface 410 restores a reception bit stream by demodulating and decoding a baseband signal when receiving data. In addition, the communication interface 410 subjects a baseband signal to up-conversion to a radio frequency (RF) band signal to transmit the RF band signal through an antenna and subjects an RF band signal received through the antenna to down-conversion to a baseband signal. For example, the communication interface 410 may include a transmission filter, a reception filter, an amplifier, a mixer, an oscillator, a DAC, an ADC, etc. Furthermore, the communication interface 410 may include a plurality of RF chains. In addition, the communication interface 410 may perform beamforming. For the beamforming, the communication interface 410 may adjust the phases and magnitudes of signals that are transmitted and received through a plurality of antennas or antenna elements. The communication interface 410 transmits and receives signals as described above. Accordingly, the communication interface 410 may be referred to as a transmitter, a receiver, or a transceiver. The communication interface 410 operates under the control of the controller 440.

According to one embodiment, the communication interface 410 receives channel quality information from the receiving end 110 and the relay end 120. The channel quality information received from the receiving end 110 indicates the channel state between the receiving end 110 and the transmitting end 130 and the channel state between the receiving end 110 and the relay end 120. The communication interface 410 transmits network information and resource allocation information to the receiving end 110.

The storage 420 stores data, such as a basic program, an application program, and setup information, for the operation of the transmitting end 130. In particular, the storage 420 may store a code book for beamforming of data signals. Further, the storage 420 provides the stored data in response to a request of the controller 440. The storage 420 may be referred to as the internal storage device.

The backhaul communication interface 430 provides an interface for communicating with other nodes within a network. Namely, the backhaul communication interface 430 coverts bit streams transmitted to the other nodes (for example, other transmitting ends, control nodes, core networks, etc.) from the transmitting end 130 into physical signals and converts physical signals received from the other nodes into bit streams. For example, the backhaul communication interface 430 transmits and receives data with other transmitting ends. The backhaul communication interface 430 performs backhaul communication with the relay end 120. The backhaul communication interface 430 may receive channel quality information from the relay end 120. The channel quality information received from the relay end 120 indicates the channel state between the relay end 120 and the transmitting end 130. The backhaul communication interface 430 may transmit network information and resource allocation information to the relay end 120. The backhaul communication interface 430 may perform backhaul communication with the relay end 120.

The controller 440 controls overall operations of the transmitting end. For example, the controller 440 transmits and receives signals through the communication interface 410. Furthermore, the controller 440 records data in the storage 420 and reads the data from the storage 420. For this purpose, the controller 440 may include at least one processor.

According to one embodiment, the controller 440 determines an achievable rate on the basis of channel quality information and determines whether to use multi-hop on the basis of the achievable rate.

According to one embodiment, the controller 440 determines the relay end 120 for the receiving end 110 on the basis of the achievable rate. For example, the relay end 120 for the receiving end 110 may be referred to as the cooperative transmitting end.

According to one embodiment, the controller 440 may control the transmitting end 130 to perform the procedure illustrated in FIG. 5, etc.

FIG. 5 illustrates a procedure of a transmission and reception for a receiving end, a relay end, and a transmitting end in a wireless communication system according to one embodiment of the present disclosure. FIG. 5 exemplifies transmission and reception of signals by the receiving end 110, the relay end 120, and the transmitting end 130 in the wireless communication system. The transmitting end 130 receives channel quality information from the relay end 120 and the receiving end 110 and determines whether to use multi-hop on the basis of the channel quality information.

Referring to FIG. 5, the relay end 120 transmits channel quality information to the transmitting end 130 in step 501. The relay end 120 transmits the channel quality information to the transmitting end 130. For example, the relay end 120 may transmit the channel quality information to the transmitting end 130 through a backhaul network. The channel quality information transmitted by the relay end 120 indicates the channel state between the relay end 120 and the transmitting end 130.

In step 503, the receiving end 110 transmits channel quality information to the transmitting end 130. The channel quality information transmitted by the receiving end 110 indicates the channel state between the receiving end 110 and the transmitting end 130 and the channel state between the receiving end 110 and the relay end 120. The transmitting end 130 may determine communication states of entities located within a cell on the basis of the channel quality information received from the relay end 120 and the channel quality information received from the receiving end 110.

In step 505, the transmitting end 130 determines an achievable rate on the basis of the channel quality information and determines whether to use multi-hop on the basis of the determined achievable rate. The achievable rate may be determined based on whether quality of service (QoS) representing a communication state is supported. The achievable rate represents efficiency in the use of multi-hop communication when the transmitting end 130 performs communication using the relay end 120. The transmitting end 130 determines that performing communication using multi-hop communication is more efficient for data transmission as the achievable rate increases. For example, the transmitting end 130 may compare transmitting a signal to the receiving end 110 using the relay end 120 according to the determined achievable rate and directly transmitting a signal to the receiving end 110 to determine efficiency when performing communication using multi-hop communication. The transmitting end 130 determines the achievable rate to be high in a case where communication efficiency when transmitting a signal to the receiving end 110 using the relay end 120 is higher than that when directly transmitting a signal to the receiving end 110. In contrast, the transmitting end 130 determines the achievable rate to be low in a case where communication efficiency when transmitting a signal to the receiving end 110 using the relay end 120 is lower than that when directly transmitting a signal to the receiving end 110. When the transmitting end 130 determines the achievable rate to be low, the transmitting end 130 directly transmits a signal to the receiving end 110 without using other network entities. Namely, the transmitting end 130 does not support multi-hop communication.

In step 507, the transmitting end 130 determines the relay end 120 for the receiving end 110 on the basis of the achievable rate. The relay end 120 may be referred to as the cooperative base station. The relay end 120 receives a signal from the transmitting end 130, encodes and decodes the received signal, and transmits the received signal to the receiving end 110. For example, the relay end 120 may forward the decoded signal to the receiving end 110. For example, the receiving end 10 may be referred to as the serving user equipment (UE).

In step 509, the transmitting end 130 transmits network information and resource allocation information to the receiving end 110 and the relay end 120. The network information includes information on the receiving end 110 and the relay end 120. Namely, the network information may include information that indicates the performance of multi-hop communication between the transmitting end 130 and the receiving end 110 and informs of the nodes (for example, the transmitting end 130, the receiving end 110, the relay end 120, etc.) that are involved in the multi-hop communication. The resource allocation information indicates resources used by the receiving end 110 and the relay end 120 to perform communication.

In step 511, the relay end 120 determines the number of blocks for transmitting a predetermined signal. The relay end 120 may transmit the predetermined signal according to the determined block count. The predetermined signal includes a signal having a value that is known to both the transmitting end 130 and the receiving end 110. For decoding according to various embodiments, which will be described below, a coding result for a predetermined number of blocks is required. Accordingly, decoding can be initiated by transmitting the predetermined signal for a predetermined number of blocks. For example, when the transmitting end 130 first transmits a signal to the receiving end 110 and the relay end 120, the relay end 120 has no signal to be relayed to the receiving end 110. Accordingly, the relay end 120 may transmit at least one predetermined signal to the receiving end 110.

In step 513, the transmitting end 130 and the relay end 120 individually transmit a signal. In step 513-1, the relay end 120 transmits a signal to the receiving end 110. In step 513-2, the transmitting end 130 transmits a signal to the receiving end 110. The signal transmitted by the transmitting end 130 may be referred to as the first signal. The signal transmitted by the relay end 120 may be referred to as the second signal. The first signal and the second signal may be combined into one signal, and the signal may be referred to as the received signal.

In step 515, the receiving end 110 decodes the first signal and the second signal, which are received from the transmitting end 130 and the relay end 120, respectively. The decoding for the first and second signals is graph-based joint sliding window decoding.

Figure 6:
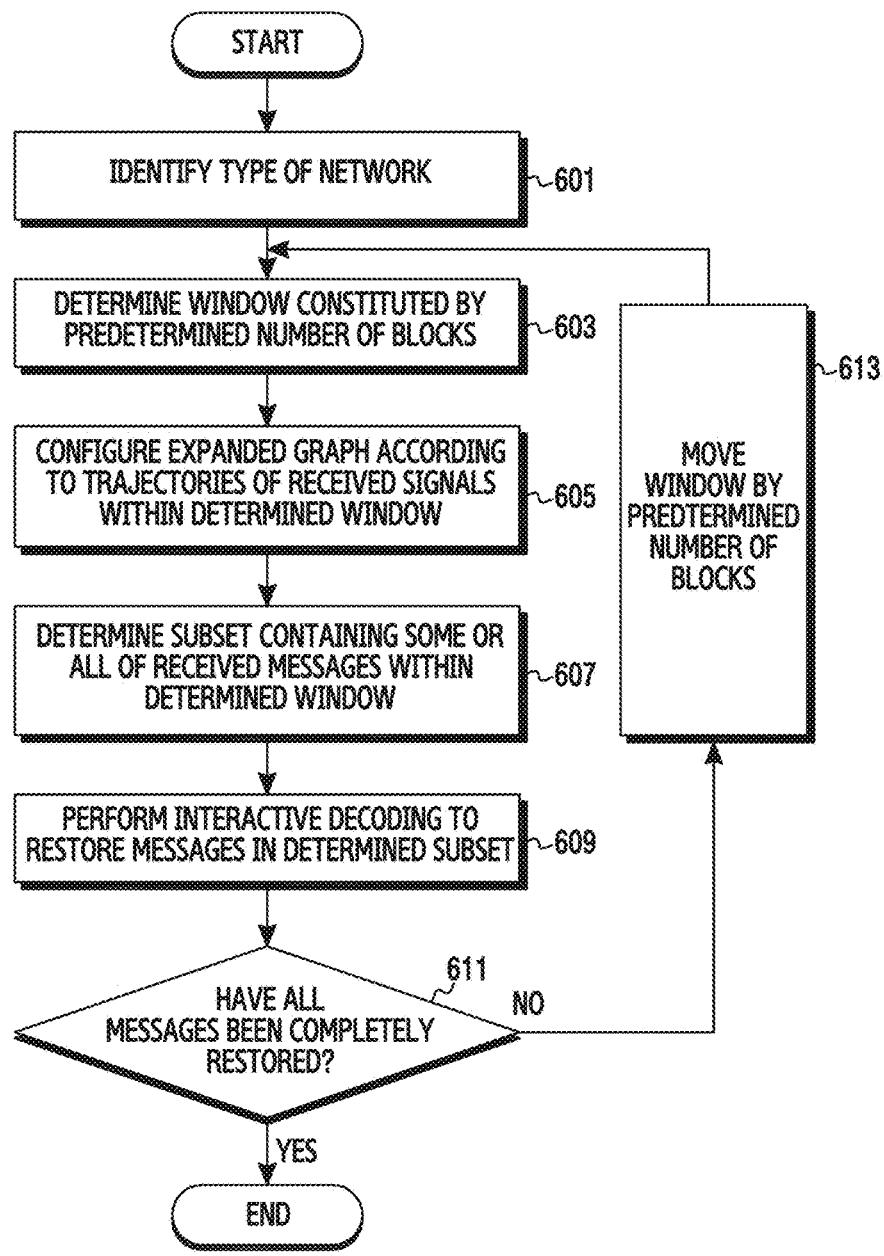
FIG. 6 illustrates a window-based message decoding procedure of a receiving end in a wireless communication system according to one embodiment of the present disclosure.

FIG. 6 illustrates a window-based message decoding procedure of a receiving end in a wireless communication system according to one embodiment of the present disclosure. FIG. 6 exemplifies a method in which the receiving end 110 performs message decoding on the basis of signals that the receiving end 110 receives within a window that includes predetermined blocks.

Referring to FIG. 6, the receiving end 110 identifies the type of network in step 601. The receiving end 110 receives network information from the transmitting end 130 to identify the type of network. For example, the receiving end 110 may receive signals from the transmitting end 130 and the relay end 120, and may identify the type of network on the basis of the received signals. For example, the receiving end 110 may receive control information from the transmitting end 130 and may identify the type of network on the basis of the control information.

In step 603, the receiving end 110 determines a window constituted by blocks. Herein, the block refers to a unit that distinguishes between intervals during which at least one signal is received by the receiving end 110, and the receiving end 110 may receive one signal from at least one entity (for example, the relay end 120 or the transmitting end 130) for one block. Namely, the block specifies the time point when the receiving end 110 receives a signal or specifies a signal received by the receiving end 110. The receiving end 110 determines the number of blocks that are included in the window. When a large number of blocks are included in the window, the receiving end 110 may accurately decode signals received from the transmitting end 130 and the relay end 120. In contrast, when a large number of blocks are included in the window, the decoding time of the receiving end 110 may increase with an increase in the number of blocks.

In step 605, the receiving end 110 configures an expanded graph according to the trajectories of the signals that the receiving end 110 has received within the determined window. Herein, configuring the expanded graph refers to determining a decoding algorithm. The decoding algorithm, which represents the sequence in which operations are performed on received signals, refers to a set of operations that are combined in a serial order. Namely, the receiving end 110 configures a sequential combination of a series of operations for decoding. In other words, the receiving end 110 determines a series of operations for decoding and the sequence thereof. The receiving end 110 configures an expanded graph mapped with the signals that the receiving end 110 has received within the determined window. For example, the receiving end 110 may induce an expanded graph according to the trajectories of the signals that the receiving end 110 has received within the determined window. Herein, configuring the expanded graph refers to determining a decoding algorithm. The decoding algorithm, which represents the sequence in which operations are performed on received signals, refers to a set of operations that are combined in a serial order. Namely, the receiving end 110 configures a sequential combination of a series of operations for decoding. In other words, the receiving end 110 determines a series of operations for decoding and the sequence thereof. When the receiving end 110 performs decoding according to the expanded graph configured thereby, the receiving end 110 may acquire information used to perform the decoding. For example, the expanded graph may be modified when the number of blocks observed by the receiving end 110 is varied. The information used in the decoding may also be modified according to the modification of the expanded graph.

In step 607, the receiving end 110 determines a subset that includes some or all of the messages that the receiving end 110 has completely received within the determined window. The received messages are messages decoded by the receiving end 110. The subset is used by the receiving end 110 to perform interactive decoding on the messages in the subset. For example, the decoding for the subset may be partial decoding. The partial decoding refers to continuously performing decoding on the blocks included in the window.

In step 609, the receiving end 110 performs interactive decoding in order to restore the messages in the determined subset. The interactive decoding is performed by the receiving end 110 to restore all the messages included in the subset.

In step 611, the receiving end 110 determines whether all the messages have been completely restored or not. The receiving end 110 determines the number of times the interactive decoding is to be performed, and when the receiving end 110 performs the interactive decoding as many times as the determined number, the receiving end 110 determines whether all the messages have been completely restored or not. Through a cyclic redundancy check (CRC), the receiving end 110 may determine whether all the messages have been completely restored or not.

The receiving end 110 ends the decoding procedure when it is determined in step 611 that all the messages have been completely restored. In contrast, when the receiving end 110 determines that all the messages have not been restored, the receiving end 110 slides the window by an arbitrary number of blocks in step 613 and returns to step 603 to select a window constituted by the next blocks. Steps 603 to 609 may be repeated until it is determined that all the messages have been completely restored.

Figure 7:
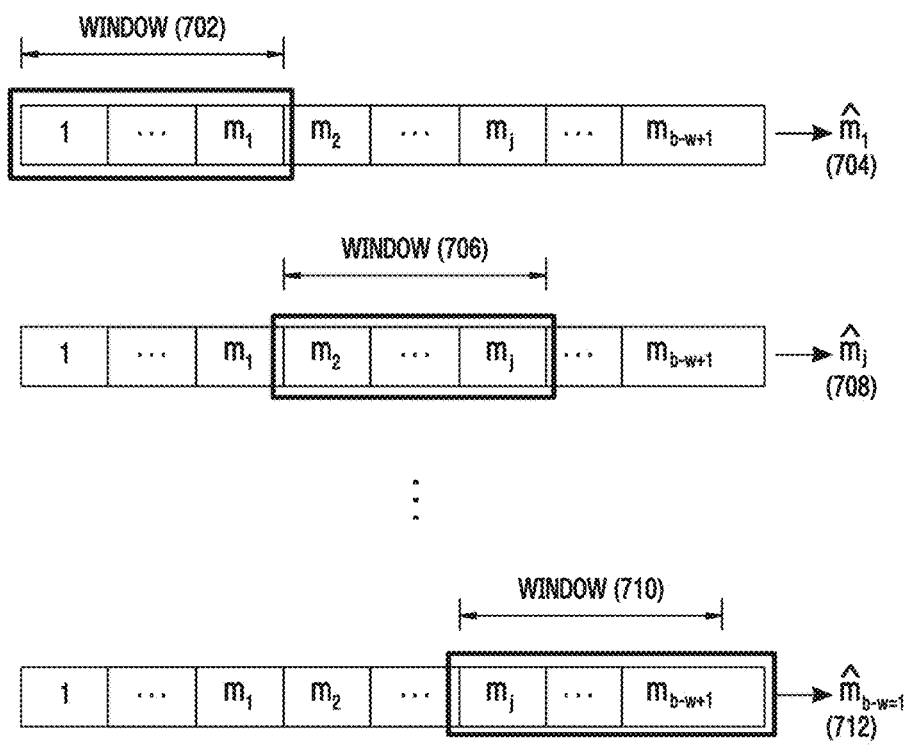
FIG. 7 illustrates blocks in a wireless communication system according to one embodiment of the present disclosure.
Figure 8:
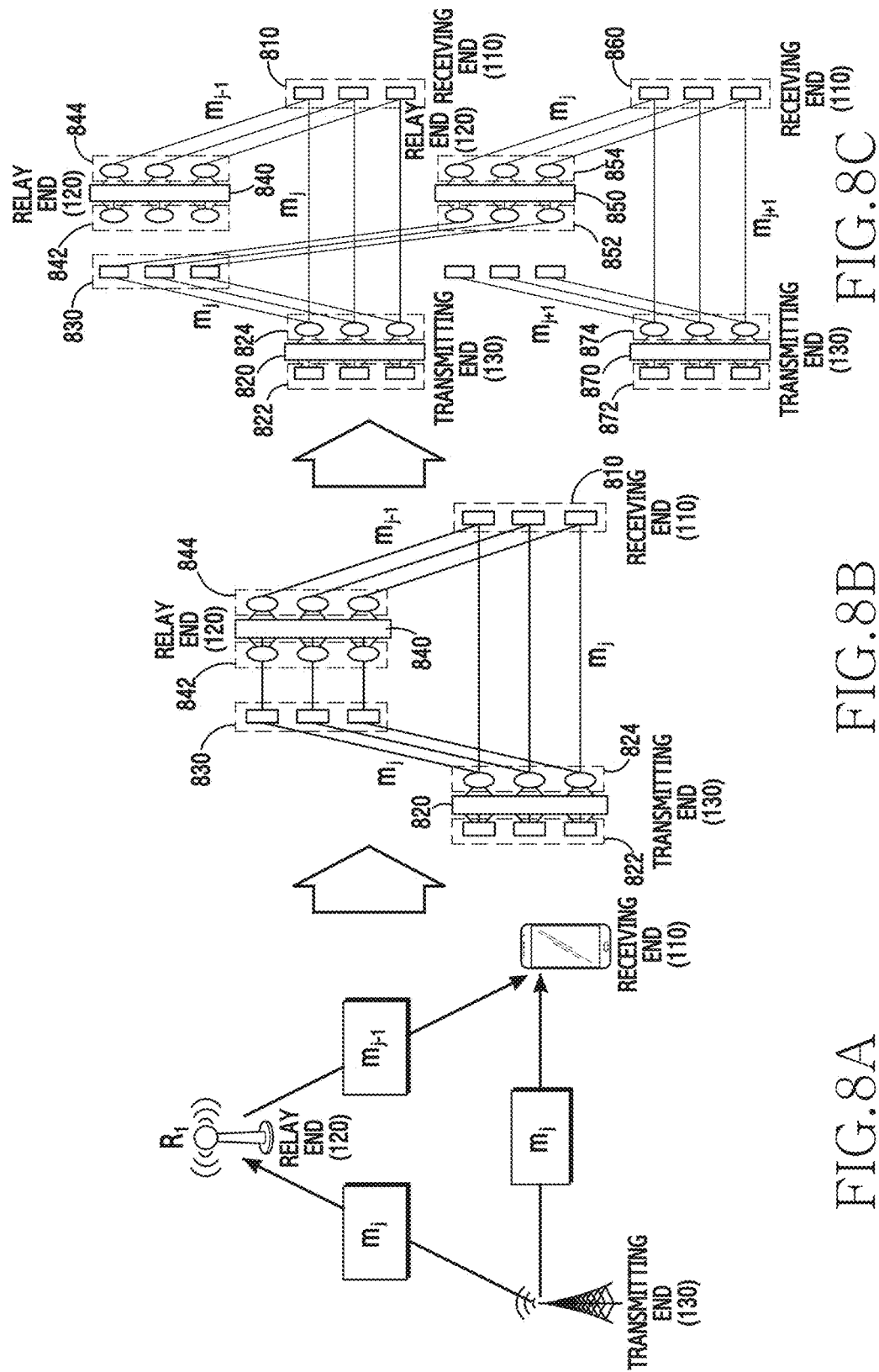
FIGS. 8A to 8C illustrate a configuration of a graphic network in a wireless communication system according to one embodiment of the present disclosure.

FIG. 7 illustrates blocks in a wireless communication system according to one embodiment of the present disclosure. FIG. 7 exemplifies the configuration of the blocks. Herein, the block refers to a unit that distinguishes between intervals during which at least one signal is received by the receiving end 110, and the receiving end 110 may receive one signal from at least one entity (for example, the relay end 120 or the transmitting end 130) for one block. Namely, the block specifies the time point when the receiving end 110 receives a signal or specifies a signal received by the receiving end 110. A window may be defined to include a plurality of blocks. The window may slide in order to observe the next blocks. The receiving end 110 may perform joint sliding window decoding on received signals within a specific window in order to decode a received codeword. In the case of the embodiment illustrated in FIG. 7, a window 702 includes three blocks. Different signals are transmitted from the transmitting end 130 and the relay end 120 for each block. The receiving end 110 restores $\hat{m}_1$ 704 by decoding signals that the receiving end 110 has received within the window 702. Each block may be constituted by n bits. n is a random number and is changed according to a codeword used in decoding. The receiving end 110 restores $\hat{m}_j$ 706 by decoding signals that the receiving end 110 has received within a window 706. The receiving end 110 restores $\hat{m}_{b-w=1}$ 712 by decoding signals that the receiving end 110 has received within a window 710. The receiving end 110 may determine the number of blocks that are included in each window 702, 706, and 710. Namely, the receiving end 110 may determine the size of each window. For example, the size of each window is based on the number of blocks that are included in the window.

FIGS. 8A to 8C illustrate a configuration of a graphic network in a wireless communication system according to one embodiment of the present disclosure. FIGS. 8A to 8C exemplify an expanded graph configured by the receiving end 110 according to the trajectories of signals received from the transmitting end 130 and the relay end 120 in the wireless communication system.

Referring to FIG. 8A, a multi-hop network is constituted by the receiving end 110, the relay end 120, and the transmitting end 130. FIG. 8A illustrates an example of a network environment constituted by three nodes. The transmitting end 130 transmits signal mj to the receiving end 110 and the relay end 120. The relay end 120 relays signal mj-1 to the receiving end 110. The receiving end 110 receives signal mj from the transmitting end 130 and signal mj-1 from the relay end 120. FIG. 8A exemplifies the flow of a signal received for one block.

FIG. 8B illustrates a graph representing the network of FIG. 8A. Referring to FIG. 8B, the receiving end 110 determines a graph network that represents the trajectory of the signal transmitted by the transmitting end 130 and the trajectory of the signal transmitted by the relay end 120. The graph network may be a virtual network configured by the receiving end 110. The transmitting end 130 is constituted by a node set 820 that includes function nodes 824 and variable nodes 822. The relay end 120 is constituted by a node set 840 that includes function nodes 842 and 844 and variable nodes 830. The receiving end 110 is constituted by variable nodes 810. The function nodes decode signals. The function nodes calculate and store LLR values of function signals according to updated LLR values of the variable nodes on the basis of predefined functions. The function nodes pass the LLR values of the function signals to the variable nodes. The node set corresponding to the transmitting end 130 forwards signal mj to the node set corresponding to the relay end 120. The node set corresponding to the transmitting end 130 forwards signal mj to the node set corresponding to the receiving end 110. The node set 840 corresponding to the relay end 120 may forward signal mj-1 decoded by the node set corresponding to the relay end 120 to the variable nodes corresponding to the receiving end 110.

Referring to FIG. 8C, the receiving end 110 configures an expanded graph according to the trajectories of received signals for two blocks. The receiving end 110 configures a graph network according to the trajectories of the signals between the transmitting end 130, the relay and 120, and the receiving end 110 for the first block. Next, the receiving end 110 configures a graph network according to the trajectories of the signals between the transmitting end 130, the relay and 120, and the receiving end 110 for the second block. The receiving end 110 configures the expanded graph by connecting the graphic network according to the trajectories of the signals of the first block and the graphic network according to the trajectories of the signals of the second block. The node set 820 corresponding to the transmitting end 130 forwards signal mj to the variable nodes 830 corresponding to the relay end 120. The node set 820 corresponding to the transmitting end 130 forwards signal mj to the variable nodes 810 corresponding to the receiving end 110. The node set 840 corresponding to the relay end 120 forwards signal mj-1 decoded by the node set 840 corresponding to the relay end 120 to the variable nodes 810 corresponding to the receiving end 110. According to the graph network configured for the second block, the node set 870 corresponding to the transmitting end 130 forwards signal mj+1 to the node set corresponding to the relay end 120. The node set 870 corresponding to the transmitting end 130 forwards signal mj+1 to the variable nodes 860 corresponding to the receiving end 110. The node set 850 corresponding to the relay end 120 forwards signal mj decoded by the node set 850 corresponding to the relay end 120 to the variable nodes 860 corresponding to the receiving end 110. For example, the receiving end 110 may configure an expanded graph modified according to the number of blocks. Herein, configuring the expanded graph refers to determining a decoding algorithm. The decoding algorithm, which represents the sequence in which operations are performed on received signals, refers to a set of operations that are combined in a serial order. Namely, the receiving end 110 configures a sequential combination of a series of operations for decoding. In other words, the receiving end 110 determines a series of operations for decoding and the sequence thereof. The expanded graph includes a path for forwarding information converted by the check nodes corresponding to the relay end 120 of the first block to the node set corresponding to the relay end 120 of the second block. The receiving end 110 may configure an expanded graph by observing at least two blocks. Herein, the block refers to a unit that distinguishes between intervals during which at least one signal is received by the receiving end 110, and the receiving end 110 may receive one signal from at least one entity (for example, the relay end 120 or the transmitting end 130) for one block. Namely, the block specifies the time point when the receiving end 110 receives a signal or specifies a signal received by the receiving end 110.

Figure 9:
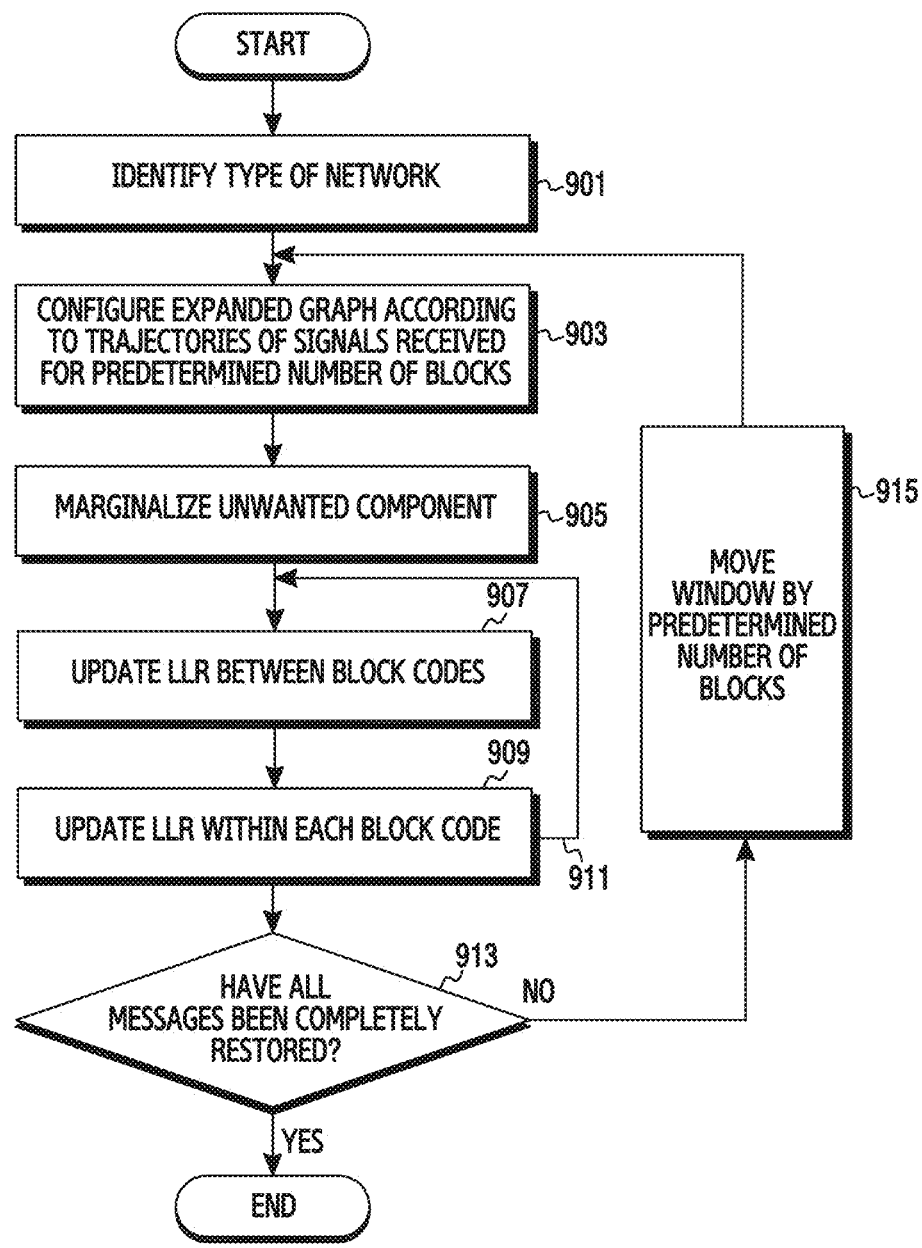
FIG. 9 illustrates a window-based received-signal decoding procedure in a wireless communication system according to one embodiment of the present disclosure.

FIG. 9 illustrates a window-based message decoding procedure in a wireless communication system according to one embodiment of the present disclosure. FIG. 9 exemplifies a method in which the receiving end 110 updates an LLR value between block codes according to an expanded graph and updates an LLR value within each block code when performing window-based message decoding as in FIG. 6.

Referring to FIG. 9, the receiving end 110 identifies the type of network in step 901. The receiving end 110 receives network information from the transmitting end 130 to identify the type of network. For example, the receiving end 110 may receive signals from the transmitting end 130 and the relay end 120, and may identify the type of network on the basis of the received signals. For example, the receiving end 110 receives control information from the transmitting end 130 and identifies the type of network on the basis of the control information.

In step 903, the receiving end 110 configures an expanded graph according to the trajectories of signals received for predetermined blocks. Herein, configuring the expanded graph refers to determining a decoding algorithm. The decoding algorithm, which represents the sequence in which operations are performed on received signals, refers to a set of operations that are combined in a serial order. Namely, the receiving end 110 configures a sequential combination of a series of operations for decoding. In other words, the receiving end 110 determines a series of operations for decoding and the sequence thereof. The receiving end 110 may receive network information from the transmitting end 130 and may configure an expanded graph according to the trajectories of signals of network entities. For example, for a first block, signal mj has a trajectory along which signal mj is forwarded to the receiving end 110 and the relay end 120. Signal mj−1 has a trajectory along which signal mj−1 is forwarded from the relay end 120 to the receiving end 110. For a second block, signal mj+1 has a trajectory along which signal mj+1 is forwarded to the receiving end 110 and the relay end 120. Signal mj has a trajectory along which signal mj is forwarded from the relay end 120 to the receiving end 110.

In step 905, the receiving end 110 marginalizes an unwanted component. For example, the unwanted component is a component that is considered to be unnecessary when the receiving end 110 configures an expanded graph. For example, the unwanted component may be the trajectory of signal mj+1 forwarded from the transmitting end 130 to the relay end 120 for the second block. For example, the unwanted component may be the trajectory of a signal that is not required when the receiving end 110 performs decoding.

In step 907, the receiving end 110 updates an LLR value between block codes according to the configured expanded graph. The receiving end 110 updates an LLR using a signal transmitted by the transmitting end 130 and a signal that is decoded by the relay end 120 and relayed to the receiving end 110.

In step 909, the receiving end 110 updates an LLR within each block code. The receiving end 110 may use a symbol-by-symbol MAP algorithm similar to a sum-product algorithm. The algorithm used by the receiving end 110 may be changed according to codes used for coding. For example, an available code includes a turbo code, an LDPC code, etc. Check nodes and variable nodes in each channel encoder update LLR values according to a known decoding algorithm and store the same. Function nodes calculate LLR values of a function signal according to the updated LLR values of the variable nodes based on a pre-defined function and store the same, and pass the LLR values of the function signal to the variable nodes. The receiving end 110 repeats the update of the LLR between the block codes and the update of the LLR within each block code through step 911.

The receiving end 110 ends the decoding procedure when it is determined in step 913 that all messages have been completely restored. In contrast, when the receiving end 110 determines that all the messages have not been restored, the receiving end 110 slides the window by an arbitrary number of blocks in step 915 and returns to step 903 to select an arbitrary window constituted by blocks. The receiving end 110 repeats steps 903 to 911 until it is determined that all the messages have been completely restored. Through a cyclic redundancy check (CRC), the receiving end 110 determines whether all the messages have been completely restored or not.

Figure 10B:
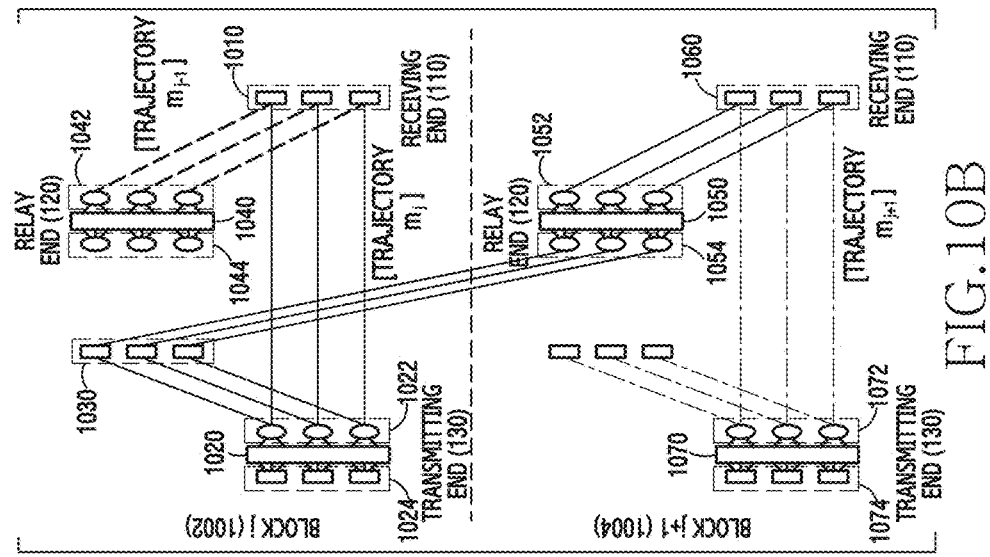
FIGS. 10A and 10B illustrate an expanded graph configured on a basis of two blocks in a wireless communication system according to one embodiment of the present disclosure.
Figure 10A:
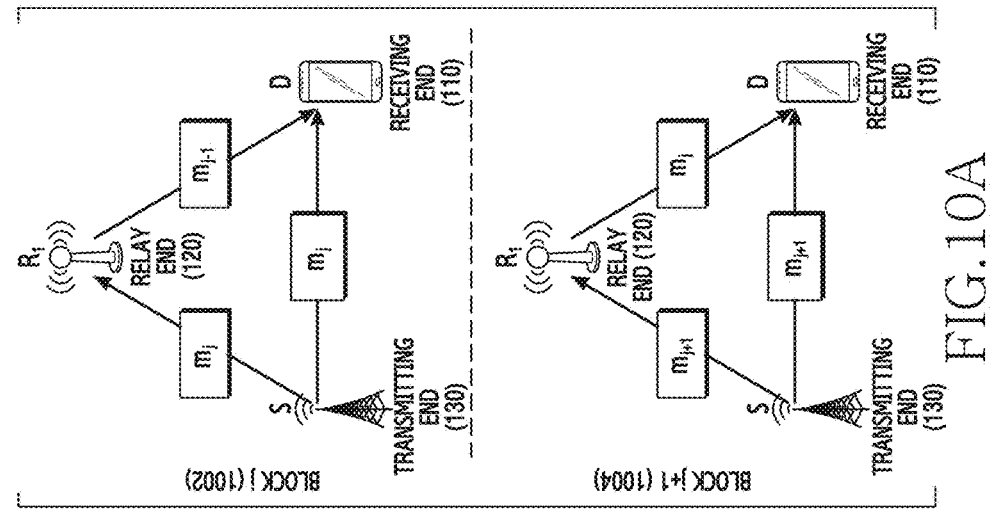

FIGS. 10A and 10B illustrate an expanded graph configured on a basis of two blocks in a wireless communication system according to one embodiment of the present disclosure. FIGS. 10A and 10B exemplify an expanded graph configured according to the trajectories of signals for two blocks.

Referring to FIG. 10A, the transmitting end 130 transmits signal mj to the relay end 120 and transmits signal mj to the receiving end 110 for block j 1002. The relay end 120 transmits signal mj−1 decoded thereby to the receiving end 110. The transmitting end 130 transmits signal mj+1 to the relay end 120 and transmits signal mj+1 to the receiving end 110 for block j+1 1004. The relay end 120 transmits signal mj decoded thereby to the receiving end 110.

Referring to FIG. 10B, the receiving end 110 configures an expanded graph according to the trajectories of the signals received for block j 1002 and block j+1 1004. For example, the receiving end 110 configures the expanded graph on the basis of network information received from the transmitting end 130. Herein, configuring the expanded graph refers to determining a decoding algorithm. The decoding algorithm, which represents the sequence in which operations are performed on received signals, refers to a set of operations that are combined in a serial order. Namely, the receiving end 110 configures a sequential combination of a series of operations for decoding. In other words, the receiving end 110 determines a series of operations for decoding and the sequence thereof. For block j 1002, signal mj has a trajectory along which signal mj is forwarded from the transmitting end 130 to the relay end 120 and the receiving end 110. The relay end 120 forwards signal mj−1 decoded thereby to the receiving end 110. The receiving end 110 configures a graph network according to the trajectories of the signals for block j 1002. For block j 1002, the node set 1020 corresponding to the transmitting end 130 is connected to check nodes 1030 in the node set corresponding to the relay end 120 and the variable nodes 1010 corresponding to the receiving end 110. The node set 1040 corresponding to the relay end 120 is connected to the variable nodes 1010 corresponding to the receiving end 110. The check nodes 1030 corresponding to the relay end 120 is connected to the node set 1050 corresponding to the relay end 120 of block j+1 1004.

The transmitting end 130 transmits signal $m_{j+1}$ to the relay end 120 and transmits signal $m_{j+1}$ to the receiving end 110 for block j+1 1004. The relay end 120 transmits signal $m_j$ decoded thereby to the receiving end 110. The receiving end 110 configures a graph network according to the trajectories of the signals for block j+1 1004. The node set 1070 corresponding to the transmitting end 130 is connected to the check nodes in the node set 1050 corresponding to the relay end 120 and the variable nodes 1060 corresponding to the receiving end 110. The node set 1050 corresponding to the relay end 120 is connected to the check nodes 1030 and the variable nodes 1060 corresponding to the receiving end 110 for block j 1002. The receiving end 110 determines unwanted elements. The receiving end 110 configures an expanded graph by marginalizing the signals that are determined to be unwanted elements. The unwanted elements may be the trajectories of signals that are not included in the path along which the receiving end 110 performs the decoding algorithm.

Figure 11A:
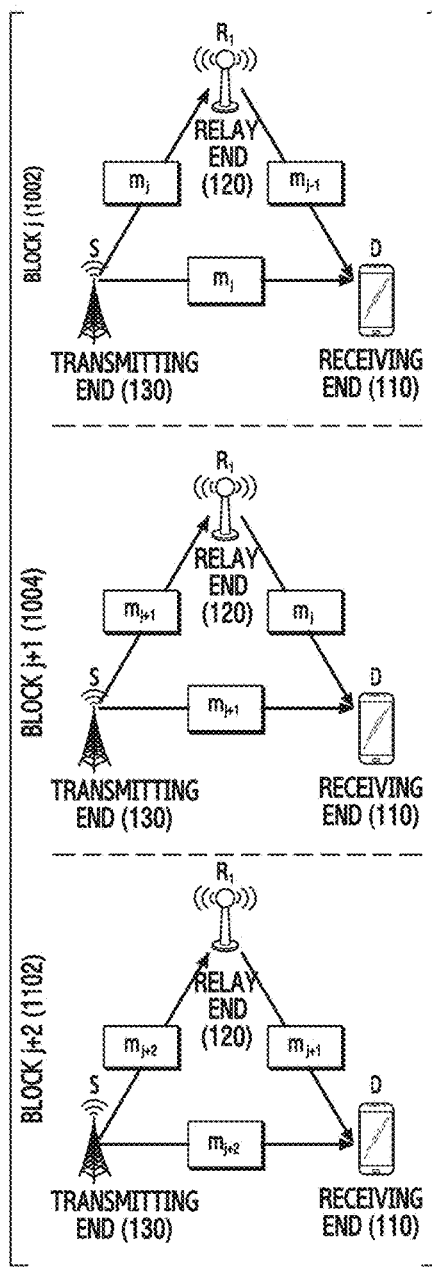
FIGS. 11A and 11B illustrate an expanded graph configured on a basis of three blocks in a case of a movement to a next window in a wireless communication system according to one embodiment of the present disclosure.
Figure 11B:
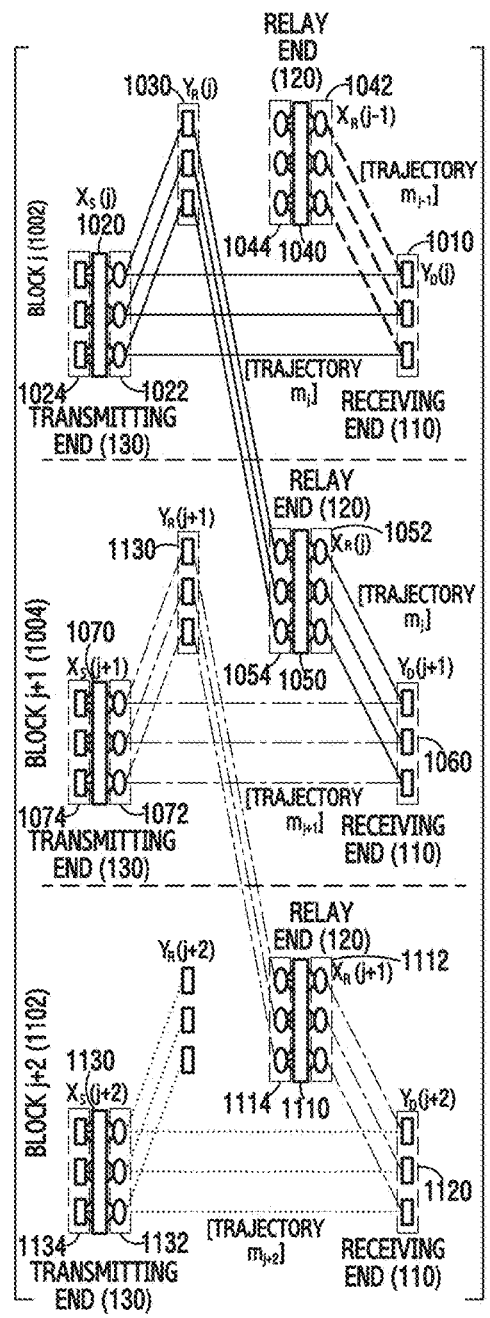

FIGS. 11A and 11B illustrate an expanded graph configured on a basis of three blocks in a case of a movement to a next window in a wireless communication system according to one embodiment of the present disclosure. Referring to FIG. 11A, the transmitting end 130 transmits signal mj to the relay end 120 and transmits signal mj to the receiving end 110 for block j 1002. The relay end 120 transmits signal mj−1 decoded thereby to the receiving end 110. The transmitting end 130 transmits signal mj+1 to the relay end 120 and transmits signal mj+1 to the receiving end 110 for block j+1 1004. The relay end 120 transmits signal mj decoded thereby to the receiving end 110. The transmitting end 130 transmits signal mj+2 to the relay end 120 and transmits signal mj+2 to the receiving end 110 for block j+2 1102. The relay end 120 transmits signal mj+1 decoded thereby to the receiving end 110.

Referring to FIG. 11B, the receiving end 110 configures an expanded graph according to the trajectories of the signals received for block j 1002, block j+1 1004, and block j+2 1102. For example, the receiving end 110 configures the expanded graph on the basis of network information received from the transmitting end 130. Herein, configuring the expanded graph refers to determining a decoding algorithm. The decoding algorithm, which represents the sequence in which operations are performed on received signals, refers to a set of operations that are combined in a serial order. Namely, the receiving end 110 configures a sequential combination of a series of operations for decoding. In other words, the receiving end 110 determines a series of operations for decoding and the sequence thereof. For block j 1002, signal mj has a trajectory along which signal mj is forwarded from the transmitting end 130 to the relay end 120 and the receiving end 110. The relay end 120 forwards signal mj−1 decoded thereby to the receiving end 110. The receiving end 110 configures a graph network according to the trajectories of the signals for block j 1002. For block j 1002, the node set 1020 corresponding to the transmitting end 130 is connected to check nodes 1030 in the node set corresponding to the relay end 120 and the variable nodes 1010 corresponding to the receiving end 110. The node set 1040 corresponding to the relay end 120 is connected to the variable nodes 1010 corresponding to the receiving end 110. The check nodes 1030 corresponding to the relay end 120 is connected to the node set 1050 corresponding to the relay end 120 for block j+1 1004.

The transmitting end 130 transmits signal mj+1 to the relay end 120 and transmits signal mj+1 to the receiving end 110 for block j+1 1004. The relay end 120 transmits signal mj decoded thereby to the receiving end 110. The receiving end 110 configures a graph network according to the trajectories of the signals for block j+1 1004. The node set 1070 corresponding to the transmitting end 130 is connected to the check nodes in the node set 1050 corresponding to the relay end 120 and the variable nodes 1060 corresponding to the receiving end 110. The node set 1050 corresponding to the relay end 120 is connected to the check nodes 1030 and the variable nodes 1060 corresponding to the receiving end 110 for block j 1002.

The transmitting end 130 transmits signal $m_{j+2}$ to the relay end 120 and transmits signal $m_{j-2}$ to the receiving end 110 for block j+2 1102. The relay end 120 transmits signal $m_{j+1}$ decoded thereby to the receiving end 110. The receiving end 110 configures a graph network according to the trajectories of the signals for block j+2 1102. The node set 1130 corresponding to the transmitting end 130 is connected to the check nodes corresponding to the relay end 120 and the variable nodes 1120 corresponding to the receiving end 110. The node set 1110 corresponding to the relay end 120 is connected to the variable nodes 1120 corresponding to the receiving end 110. The check nodes 1030 corresponding to the relay end 120 for block j+1 1004 is connected to the node set 1110 corresponding to the relay end 120 for block j+2 1102. The receiving end 110 determines unwanted elements. The receiving end 110 configures an expanded graph by marginalizing the signals that are determined to be unwanted elements. For example, the receiving end 110 may configure the expanded graph by observing a window constituted by three blocks. When the receiving end 110 observes the three blocks, the expanded graph may be configured by connecting the graphic network configured for block j 1002, the graphic network configured for block j+1 1004, and the graphic network configured for block j+2 1102. When the receiving end 110 observes the three blocks, the time for the decoding performed by the receiving end 110 may increase. In contrast, the accuracy of the decoding performed by the receiving end 110 may increase.

Figure 12:
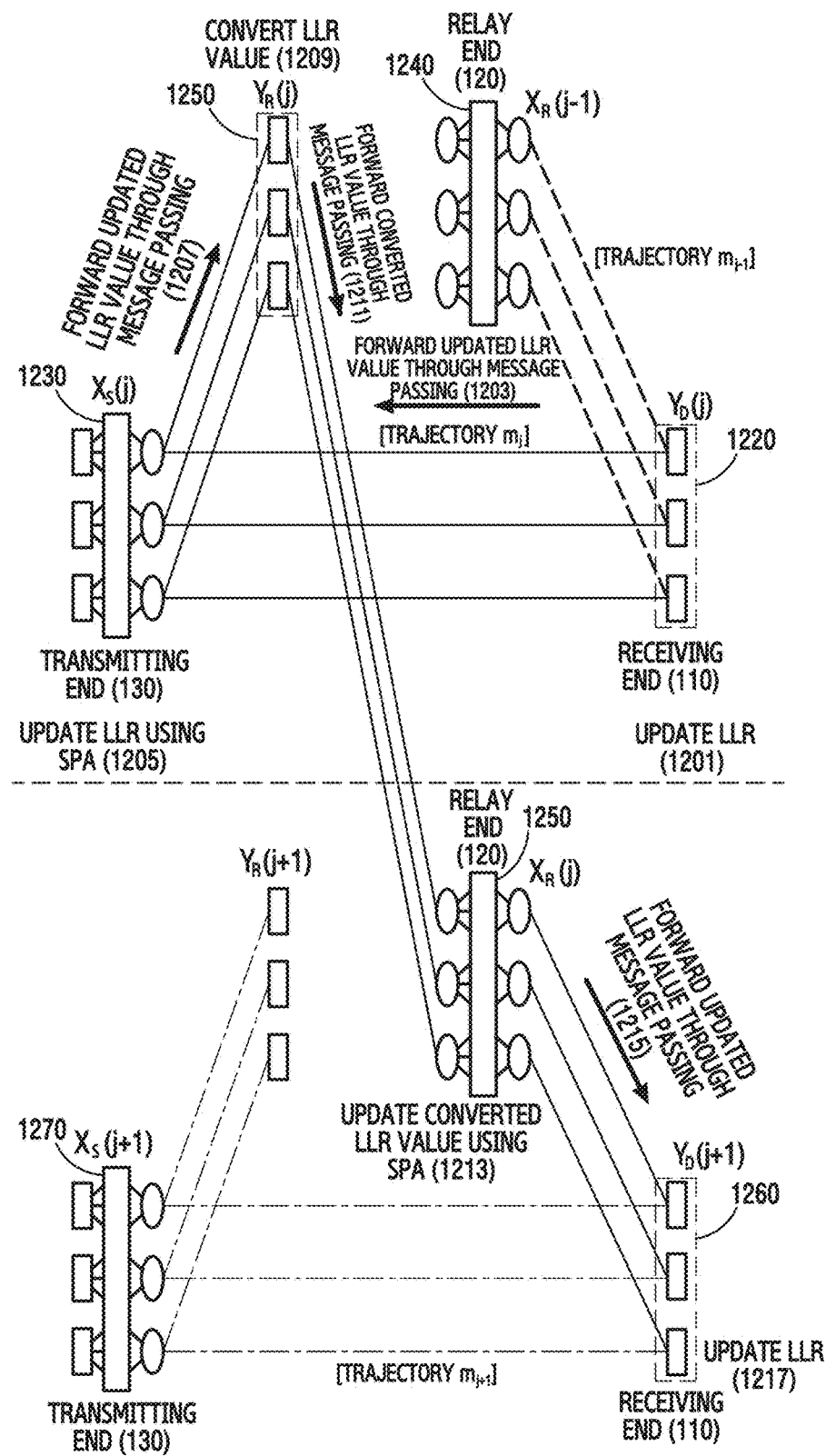
FIG. 12 illustrates a procedure of repeatedly decoding received signals according to an expanded graph in a wireless communication system according to one embodiment of the present disclosure.

FIG. 12 illustrates a procedure of repeatedly decoding received signals according to an expanded graph in a wireless communication system according to one embodiment of the present disclosure. FIG. 12 exemplifies a procedure of updating an LLR value when repeatedly performing decoding according to an expanded graph configured by the receiving end 110. Referring to FIG. 12, in step 1201, the receiving end 110 updates an LLR using a received signal $Y_D(J)$ and $X_R(j-1)$ decoded by the relay end 120 for the previous block. The received signal $Y_D(J)$ is a value that has already been identified by the receiving end 110. The receiving end 110 performs decoding as many times as the number of bits of the received signal $Y_D(J)$ and the decoded $X_R(j-1)$. The update of the LLR is based on Equation 1 below. The LLR represents a probability that a calculated value is +1, −1, a positive value, or a negative value. The following equation 1 may be calculated with the formation of an expanded graph.

$$LLR(x_{s,i}(j)) = \log \frac{\sum_{p(x_{R,i}(j-1))} p(y_{D,i}(j) \mid x_{s,i}(j) = -1, x_{R,i}(j-1))p(x_{R,i}(j-1))}{\sum_{p(x_{R,i}(j-1))} p(y_{D,i}(j) \mid x_{s,i}(j) = 1, x_{R,i}(j-1))p(x_{R,i}(j-1))} \quad \text{Equation 1}$$

In Equation 1, LLR denotes a probability that a calculated value is positive and a probability that a calculated value is negative. s denotes the index of a source end, i denotes the index of a bit, and (j) denotes the index of a block. Namely, $LLR(x_{s,i}(j))$ denotes the LLR of the i-th bit of a signal $x_s(j)$ that is received from the transmitting end 130 for block j. $y_{D,i}(j)$ is the i-th bit value of $y_D(j)$ that has already been received by the receiving end 110 for block j. $x_{s,i}(j)$ is the i-th bit value of $x_s(j)$ that is transmitted by the transmitting end 130 for block j. $x_{R,i}(j-1)$ is the i-th bit value of $x_R(j-1)$ that is a signal received and decoded by the relay end 120 for block j−1. p denotes a probability. Equation 1 is identically performed for bit values from 1 to n. Block j−1 is a block prior to block j.

In step 1203, the receiving end 110 forwards the LLR value, which has been updated using the received signal $Y_D(J)$ and $X_R(j-1)$ decoded by the relay end 120 for the previous block, to the node set corresponding to the transmitting end 130 according to the expanded graph through message passing. The message passing refers to forwarding information between nodes. For example, information generated by the variable nodes corresponding to the receiving end 110 may be forwarded from the variable nodes corresponding to the receiving end 110 to the node set corresponding to the transmitting end 130. The information may be data, a message, a signal, etc.

In step 1205, the node set corresponding to the transmitting end 130 updates an LLR value using a sum-product algorithm. The LLR value updated using the sum-product algorithm is a value associated with $x_s(j)$. Check nodes and variable nodes in each channel encoder update LLR values according to a known decoding algorithm and store the same, and function nodes calculate LLR values of a function signal according to the updated LLR values of the variable nodes based on a pre-defined function and store the same.

In step 1207, the node set corresponding to the transmitting end 130 forwards the value updated using the sum-product algorithm to the check nodes in the node set corresponding to the relay end 120 through message passing. The check nodes serve as a reception side of the relay end 120.

In step 1209, the check nodes of the node set corresponding to the relay end 120 convert the LLR. The check nodes in the node set corresponding to the relay end 120 convert $x_s(j)$ corresponding to the updated LLR value into $Y_R(j)$.

In step 1211, the check nodes in the node set corresponding to the relay end 120 forward the converted LLR value to the node set corresponding to the relay end 120 of the next block according to the expanded graph through message passing. The next block refers to block j+1 subsequent to block j.

In step 1213, the node set corresponding to the relay end of the next block updates the LLR using a sum-product algorithm. Steps 1207 to 1213 are performed using equation 2 below.

$$LLR(y_{R,i}(j)) = \log \frac{\sum_{p(x_{S,i}(j))} p(y_{R,i}(j) = -1 \mid x_{s,i}(j))p(x_{s,i}(j))}{\sum_{p(x_{S,i}(j))} p(y_{R,i}(j) = 1 \mid x_{s,i}(j))p(x_{s,i}(j))} \quad \text{Equation 2}$$

In Equation 2, LLR denotes a probability that a calculated value is positive and a probability that a calculated value is negative. R denotes the index of the relay end, i denotes the index of a bit, and (j) denotes the index of block j. Namely, $LLR(y_{R,i}(j))$ denotes the LLR of the i-th bit of a signal $y_R(j)$ that is received from the check nodes corresponding to the relay end 120 for block j. $x_{S,i}(j)$ denotes the LLR of the i-th bit of a signal $x_R(j)$ that is received from the transmitting end 130. $y_{R,i}(j)$ is the i-th bit value changed by the check nodes for block j.

In step 1215, the LLR value updated by the node set corresponding to the relay end 120 for block j+1 according to the expanded graph is forwarded to the variable nodes corresponding to the receiving end 110 for block j+1 through message passing.

In step 1217, extrinsic information is derived by marginalizing a signal containing received signals YD(j+1) and mj+1, which serves as noise, according to the expanded graph and updating the LLR.

The node set corresponding to the receiving end 110 may update the LLR for the node set corresponding to block j+1. The LLR is updated on the basis of equation 3 below.

$$LLR(x_{s,i}(j+1)) = \log \frac{\sum_{p(x_{R,i}(j))} p(y_{D,i}(j+1) \mid x_{s,i}(j+1) = -1, x_{R,i}(j))p(x_{R,i}(j))}{\sum_{p(x_{R,i}(j))} p(y_{D,i}(j+1) \mid x_{s,i}(j+1) = 1, x_{R,i}(j))p(x_{R,i}(j))} \quad \text{Equation 3}$$

In Equation 3, LLR denotes a probability that a calculated value is positive and a probability that a calculated value is negative. s denotes the index of a source end, i denotes the index of a bit, and (j+1) denotes the index of block j+1. Namely, $LLR(x_{S,i}(j+1))$ is the LLR value of $x_{S,i}(j+1)$ that is calculated by the node set corresponding to the relay end 120 for block j+1. $y_{D,i}(j+1)$ is the i-th bit value of $y_D(j+1)$ that has already been received by the receiving end 110 for block j+1. $x_{s,i}(j+1)$ is the i-th bit value of $x_s(j+1)$ that is transmitted by the transmitting end 130 for block j+1. $x_{R,i}(j)$ is the i-th bit value of $x_R(j)$ that is a signal received and decoded by the relay end 120 for block j. p denotes a probability. Equation 1 is identically performed for bit values from 1 to n. Block j+1 is subsequent to block j. $x_{R,i}(j)$ is determined by the update of the LLR value that has been performed for the previous block.

The receiving end 110 performs message passing for decoding in the reverse order of Equation 1, Equation 2, and Equation 3. The decoding performed in the reverse order may be described by Equations 4 to 6 below, and each value varies according to the updated LLR value.

$$LLR(x_{R,i}(j)) = \log \frac{\sum_{p(x_{s,i}(j+1))} p(y_{D,i}(j+1) | x_{s,i}(j+1), x_{R,i}(j) = -1) p(x_{s,i}(j+1))}{\sum_{p(x_{s,i}(j+1))} p(y_{D,i}(j+1) | x_{s,i}(j+1), x_{R,i}(j) = 1) p(x_{s,i}(j+1))}$$ Equation 4

In Equation 4, LLR denotes a probability that a calculated value is positive and a probability that a calculated value is negative. R denotes the index of the relay end, i denotes the index of a bit, and (j) denotes the index of block j. Namely, $LLR(x_{R,i}(j))$ denotes the LLR of the i-th bit of a signal $x_R(j)$ that is received from the check nodes corresponding to the relay end 120 for block j. $x_{S,i}(j)$ denotes the LLR of the i-th bit of a signal $x_S(j)$ that is received from the transmitting end 130. $y_{R,i}(j)$ is the i-th bit value changed by the check nodes for block j.

In step 1215, the node set corresponding to the transmitting end 120 for block j+1 updates the LLR value using a sum-product algorithm. For example, the sum-product algorithm may vary according to a turbo code and an LDPC code.

$$LLR(x_{s,i}(j)) = \log \frac{\sum_{p(y_{R,i}(j))} p(y_{R,i}(j) | x_{s,i}(j) = -1) p(y_{R,i}(j))}{\sum_{p(y_{R,i}(j))} p(y_{R,i}(j) | x_{s,i}(j) = 1) p(y_{R,i}(j))}$$ Equation 5

In Equation 5, LLR denotes a probability that a calculated value is positive and a probability that a calculated value is negative. S denotes the index of a source end, i denotes the index of a bit, and (j) denotes the index of block j. Namely, $LLR(x_{S,i}(j))$ denotes the LLR of the i-th bit of a signal $x_s(j)$ that is received from the check nodes corresponding to a source end for block j. $x_{S,i}(j)$ denotes the LLR of the i-th bit of a signal $x_S(j)$ that is received from the transmitting end 130. $y_{R,i}(j)$ is the i-th bit value changed by the check nodes for block j.

$$LLR(x_{R,i}(j-1)) = \log \frac{\sum_{p(x_{s,i}(j))} p(y_{D,i}(j) | x_{s,i}(j), x_{R,i}(j-1) = -1) p(x_{s,i}(j))}{\sum_{p(x_{s,i}(j))} p(y_{D,i}(j) | x_{s,i}(j), x_{R,i}(j-1) = 1) p(x_{s,i}(j))}$$ Equation 6

In Equation 6, LLR denotes a probability that a calculated value is positive and a probability that a calculated value is negative. R denotes the index of the relay end, i denotes the index of a bit, and (j-1) denotes the index of block j-1. Namely, $LLR(x_{R,i}(j-1))$ denotes the LLR of the i-th bit of a signal $x_R(j-1)$ that is received from the node set corresponding to the relay end 120 for block j-1. $y_{D,i}(j)$ is the i-th bit value of $y_D(j)$ that has already been received by the receiving end 110 for block j. $x_{S,i}(j-1)$ is the i-th bit value of $x_S(j)$ that is transmitted by the transmitting end 130 for block j-1. $x_{R,i}(j-1)$ is the i-th bit value of $x_R(j-1)$ that is a signal received and decoded by the relay end 120 for block j-1. p denotes a probability. Equation 6 is identically performed for bit values from 1 to n. Block j-1 is a block prior to block j. The blocks may include different information.

The processes corresponding to Equations 1 to 6 may be repeatedly performed by sliding the window by the number of selected blocks and inducing an expanded graph.

Figure 13:
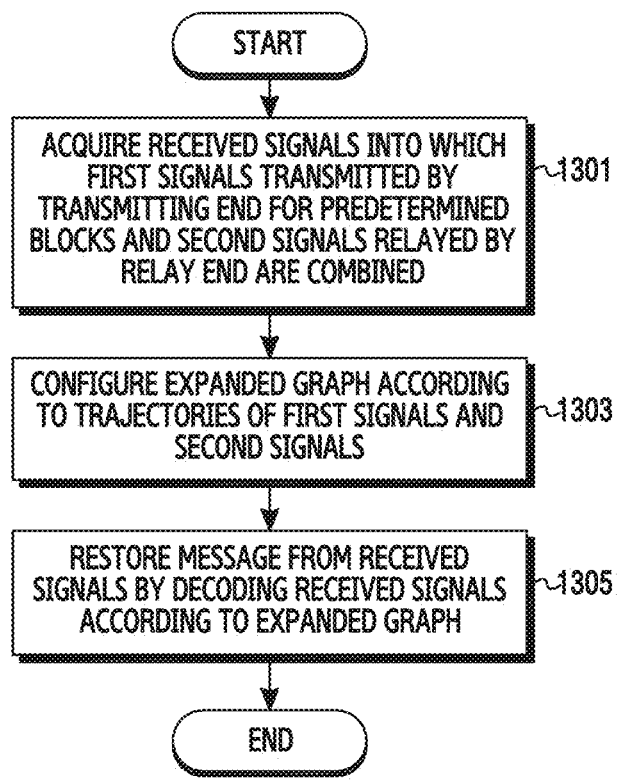
FIG. 13 illustrates a received-signal decoding procedure of a receiving end in a wireless communication system according to one embodiment of the present disclosure.

FIG. 13 illustrates a received-signal decoding procedure of a receiving end in a wireless communication system according to one embodiment of the present disclosure. FIG. 13 exemplifies a procedure in which the receiving end 110 receives signals from the transmitting end 130 and the relay end 120 and decodes the received signals.

Referring to FIG. 13, in step 1301, the receiving end 110 acquires received signals into which first signals transmitted by the transmitting end for predetermined blocks and second signals relayed by the relay end 120 are combined. Herein, the block refers to a unit that distinguishes between intervals during which at least one signal is received by the receiving end 110, and the receiving end 110 may receive one signal from at least one entity (for example, the relay end 120 or the transmitting end 130) for one block. Namely, the block specifies the time point when the receiving end 110 receives a signal or specifies a signal received by the receiving end 110. The first signals are directly received from the transmitting end 130, and the second signals are relayed through the relay end 120. For example, the receiving end 110 receives signal m from the transmitting end 130 and receives signal n from the relay end 120 or receives no signal for a first block. Namely, the receiving end 110 receives different signals from the transmitting end 130 and the relay end 120.

In step 1303, the receiving end 110 configures an expanded graph according to the trajectories of the first signals and the second signals. Herein, configuring the expanded graph refers to determining a decoding algorithm. The decoding algorithm, which represents the sequence in which operations are performed on received signals, refers to a set of operations that are combined in a serial order. Namely, the receiving end 110 configures a sequential combination of a series of operations for decoding. In other words, the receiving end 110 determines a series of operations for decoding and the sequence thereof. The expanded graph agrees with the flow of the first signals transmitted from the transmitting end 130 and the second signals relayed by the relay end 120. For example, the expanded graph is determined according to the trajectories of signals that are observed by the receiving end 110 for a plurality of blocks.

In step 1305, the receiving end 110 restores a message from the received signals by repeatedly decoding the received signals according to the expanded graph. The repetitive decoding may be joint window sliding decoding. For example, the receiving end 110 decodes the received signals by updating an LLR value according to the configured expanded graph. The receiving end 110 updates the LLR value using the already acquired signals and signals relayed by the relay end 120. The receiving end 110 forwards the updated LLR value to the node set corresponding to the transmitting end 130 according to the expanded graph through message passing. The receiving end 110 updates the LLR value using a sum-product algorithm at the node set corresponding to the transmitting end 130. The receiving end 110 forwards the LLR value, which has been updated using the sum-product algorithm at the node set corresponding to the transmitting end 130, to the check nodes in the node set corresponding to the relay end 120 through message passing.

The check nodes convert the updated LLR value. For example, the check nodes convert $X_S(j)$ into $Y_R(j)$. The check nodes forward the converted value to the node set corresponding to the relay end 120 of the next block through message passing. The node set corresponding to the relay end 120 of the next block updates the converted LLR value using a sum-product algorithm. The node set corresponding to the relay end 120 of the next block performs message passing to the node corresponding to the receiving end of the next block. For example, the node corresponding to the receiving end of the next block acquires $Y_D(j+1)$ from the node set corresponding to the relay end of the next block through message passing. The node corresponding to the receiving end of the next block treats a signal received from the transmitting end of the next block as noise. For example, the node corresponding to the receiving end of the next block marginalizes signal $m_{j+1}$ received from the transmitting end of the next block. The node corresponding to the receiving end of the next block updates the LLR value and derives extrinsic information. The receiving end 110 determines whether the message decoding has been completed or has failed. When the receiving end 110 determines that the message decoding has not been completed or has not failed, the receiving end 110 repeats decoding by updating the LLR value in the reverse direction. The receiving end 110 may determine the number of times the decoding is repeated.

Figure 14:
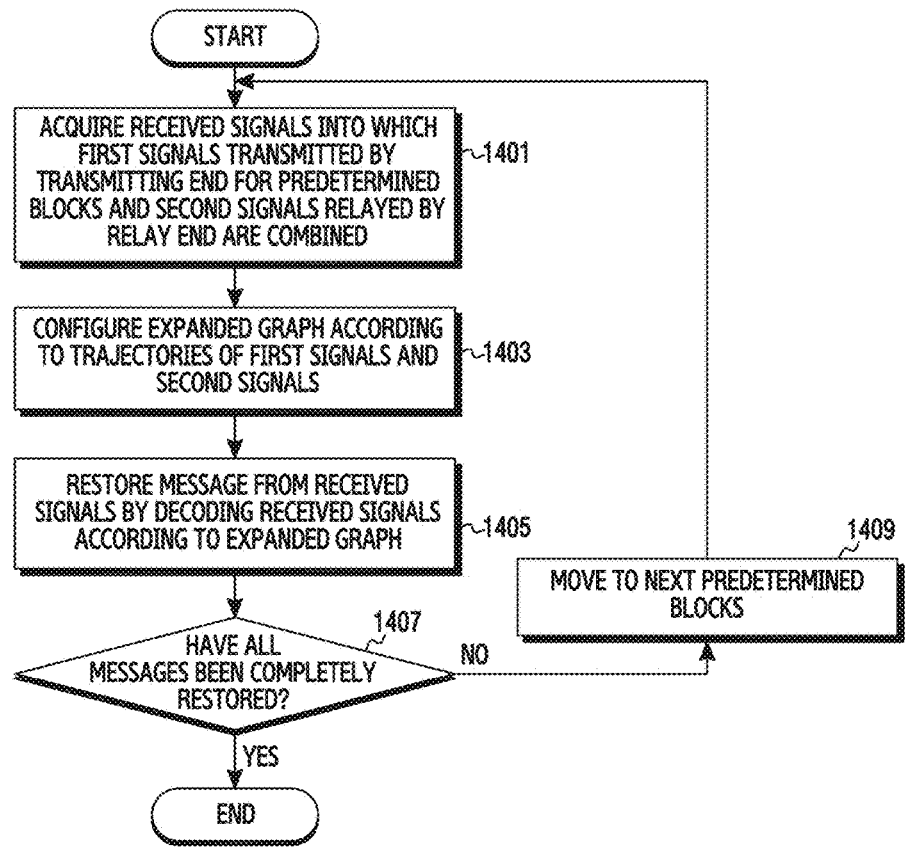
FIG. 14 illustrates a received-signal decoding procedure of a receiving end in a wireless communication system according to another embodiment of the present disclosure.

FIG. 14 illustrates a received-signal decoding procedure of a receiving end in a wireless communication system according to another embodiment of the present disclosure. FIG. 14 exemplifies a procedure in which the receiving end decodes a received signal in the wireless communication system according to one embodiment. FIG. 14 exemplifies a procedure in which when the receiving end 110 receives signals from the transmitting end 130 and the relay end 120 and decodes the received signals, if a message is determined not to be completely restored, the receiving end 110 slides an observation window to observe signals for the next predetermined blocks and to decode the received signals. Referring to FIG. 14, in step 1401, the receiving end 110 acquires received signals into which first signals transmitted by the transmitting end for predetermined blocks and second signals relayed by the relay end 120 are combined. The first signals are directly received from the transmitting end 130, and the second signals are relayed through the relay end 120. For example, the receiving end 110 receives signal m from the transmitting end 130 and receives signal n from the relay end 120 or receives no signal for a first block. Namely, the receiving end 110 receives different signals from the transmitting end 130 and the relay end 120.

In step 1403, the receiving end 110 configures an expanded graph according to the trajectories of the first signals and the second signals. Herein, configuring the expanded graph refers to determining a decoding algorithm. The decoding algorithm, which represents the sequence in which operations are performed on received signals, refers to a set of operations that are combined in a serial order. Namely, the receiving end 110 configures a sequential combination of a series of operations for decoding. In other words, the receiving end 110 determines a series of operations for decoding and the sequence thereof. The expanded graph agrees with the flow of the first signals transmitted from the transmitting end 130 and the second signals relayed by the relay end 120. For example, the expanded graph is determined according to the trajectories of signals that are observed by the receiving end 110 for a plurality of blocks.

In step 1405, the receiving end 110 restores a message from the received signals by repeatedly decoding the received signals according to the expanded graph. The repetitive decoding may be joint window sliding decoding. For example, the receiving end 110 decodes the received signals by updating an LLR value according to the configured expanded graph. The receiving end 110 updates the LLR value using the already acquired signals and signals relayed by the relay end 120. The receiving end 110 forwards the updated LLR value to the node set corresponding to the transmitting end 130 according to the expanded graph through message passing. The receiving end 110 updates the LLR value using a sum-product algorithm at the node set corresponding to the transmitting end 130. The receiving end 110 forwards the LLR value, which has been updated using the sum-product algorithm at the node set corresponding to the transmitting end 130, to the check nodes in the node set corresponding to the relay end 120 through message passing. The check nodes convert the updated LLR value. For example, the check nodes convert $X_S(j)$ into $Y_R(j)$. The check nodes forward the converted value to the node set corresponding to the relay end 120 of the next block through message passing. The node set corresponding to the relay end 120 of the next block updates the converted LLR value using a sum-product algorithm. The node set corresponding to the relay end 120 of the next block performs message passing to the node corresponding to the receiving end of the next block. For example, the node corresponding to the receiving end of the next block acquires $Y_D(j+1)$ from the node set corresponding to the relay end of the next block through message passing. The node corresponding to the receiving end of the next block treats a signal received from the transmitting end of the next block as noise. For example, the node corresponding to the receiving end of the next block marginalizes signal $m_{j+1}$ received from the transmitting end of the next block. The node corresponding to the receiving end of the next block updates the LLR value and derives extrinsic information.

In step 1407, the receiving end 110 determines whether all messages have been completely restored. When the receiving end 110 determines that all the messages have been completely restored, the receiving end 110 ends the decoding procedure. In contrast, when the receiving end 110 determines that all the messages have not been restored, the receiving end 110 slides the window by an arbitrary number of blocks in step 1409 and returns to step 1401 to select a window constituted by the next blocks. The receiving end 110 repeats steps 1401 to 1405 until all the messages are completely restored. For example, the receiving end 110 ends the repetitive decoding procedure when determining that the message restoring process has failed.

Figure 15:
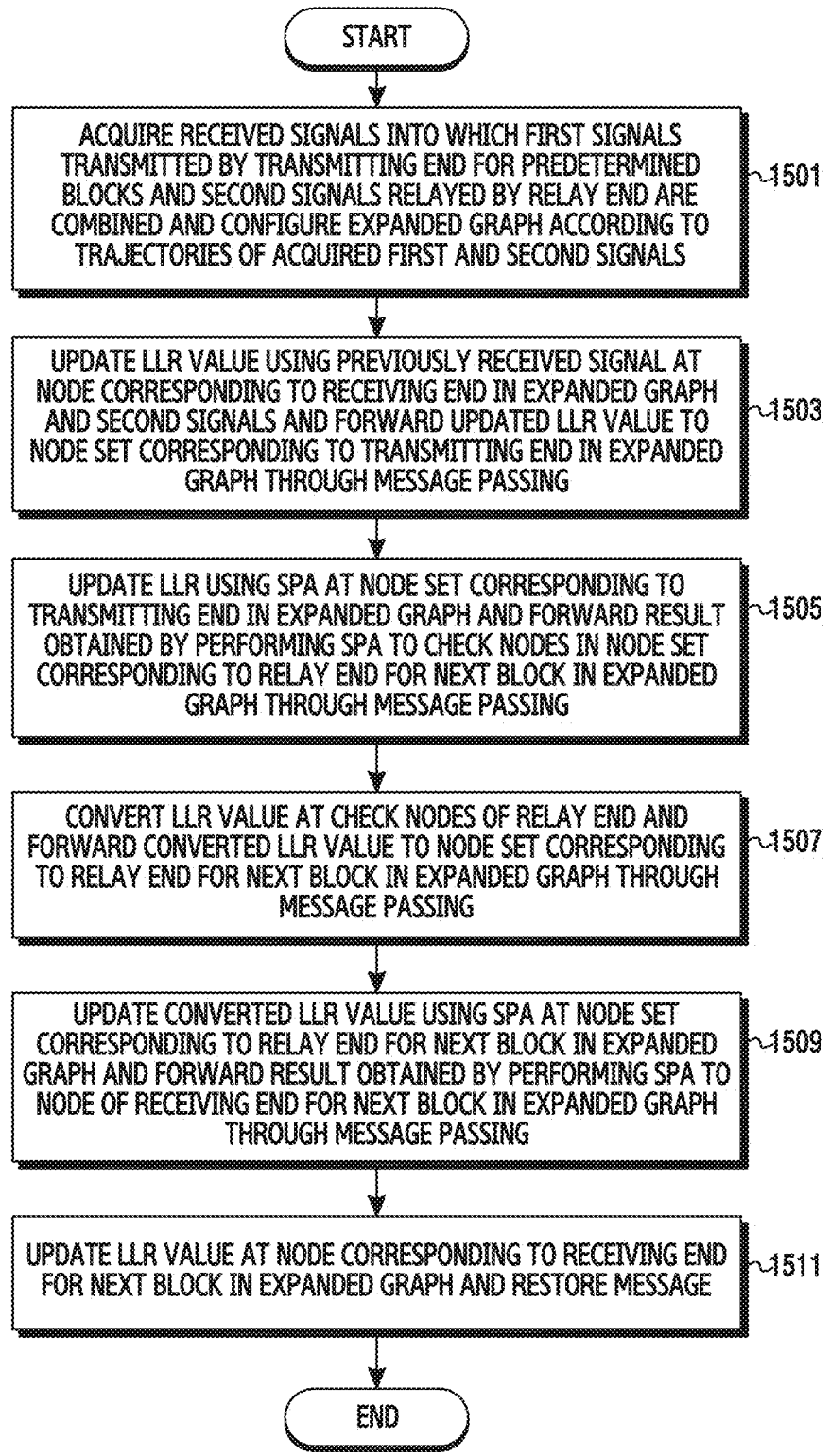
FIG. 15 illustrates a received-signal decoding procedure of a receiving end in a wireless communication system according to one embodiment of the present disclosure.

FIG. 15 illustrates a received-signal decoding procedure of a receiving end in a wireless communication system according to one embodiment of the present disclosure. FIG. 15 exemplifies a procedure in which the receiving end 110 in the wireless communication system receives signals from the transmitting end 130 and the relay end 120, configures an expanded graph according to the trajectories of the received signals, and then repeatedly performs decoding according to the expanded graph.

Referring to FIG. 15, in step 1501, the receiving end 110 acquires, for predetermined blocks, received signals into which first signals transmitted by the transmitting end and second signals relayed by the relay end are combined, and configures an expanded graph according to the trajectories of the acquired first and second signals. The expanded graph is configured according to the trajectories of signals that are received for two or more blocks. For example, the receiving end 110 is constituted by the node set corresponding to the transmitting end 130 for a first block, the node set corresponding to the relay end 120, and the variable nodes corresponding to the receiving end 110. The node sets are constituted by function nodes that perform encoding and decoding according to function values and variable nodes.

The number of function nodes and the number of variable nodes may increase or decrease according to the number of bits of the respective signals.

In step 1503, the receiving end 110 updates an LLR value using the previously received signal at the node corresponding to the receiving end in the expanded graph and the second signals and forwards the updated LLR value to the node set corresponding to the transmitting end in the expanded graph through message passing. The previously received signal, which is an observed value, is a value decoded by the receiving end 110 for the previous block and does not need to be decoded by the receiving end 110. The second signals are signals that are decoded and then encoded by the relay end 120. The message passing does not represent that a signal is transmitted from the receiving end 110 to the transmitting end 130, but represents that an LLR value updated on the expanded graph, which is a virtual network configured by the receiving end 110, is forwarded.

In step 1505, the receiving end 110 updates the LLR value, which has been updated by the node set corresponding to the transmitting end in the expanded graph, using a sum-product algorithm and forwards the result obtained by performing the sum-product algorithm to the check nodes in the node set corresponding to the relay end according to the expanded graph through message passing.

In step 1507, the receiving end 110 converts the LLR value at the check nodes in the node set corresponding to the relay end and forwards the LLR value to the node set corresponding to the relay end of the next block in the expanded graph through message passing.

In step 1509, the receiving end 110 updates the LLR value at the node corresponding to the receiving end of the next block in the expanded graph, and restores a message. Steps 1503 to 1509 are repeatedly performed by the predetermined number of times determined by the receiving end 110. In a case where steps 1503 to 1509 are completed, the LLR value is updated in the reverse order from step 1509 to step 1503. The message passing in steps 1503 to 1509 is performed according to the expanded graph configured by the receiving end 110.

The methods described in the claims or the specification of the present disclosure can be implemented using hardware and software alone or in combination.

Any such software can be stored in a computer readable storage medium. The computer readable storage medium stores one or more programs (software modules) including instructions, which when executed by at least one processor in a UE, cause the UE to perform a method of the present disclosure.

Any such software can be stored in the form of volatile or non-volatile storage such as read only memory (ROM), or in the form of memory such as random access memory (RAM), memory chips, device, or integrated circuits, or on an optically or magnetically readable medium such as a compact disc (CD)-ROM, digital versatile disc (DVD), magnetic disk or magnetic tape or the like.

It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs can be conveyed electronically via any medium such as a communication signal carried over a wired or wireless connection and embodiments suitably encompass the same.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method for operating a receiving device in a wireless communication system, the method comprising:
 receiving a signal comprising a first signal from a transmitting device and a second signal from a relay device that relays signals between the transmitting device and the receiving device, in a block of a plurality of blocks;
 determining a log likelihood ratio (LLR) value for the first signal in the block based on the signal and a decoding result of the second signal;
 determining an LLR value for a third signal received by a node corresponding to the relay device in the block based on the LLR value for the first signal;
 determining an LLR value for a fourth signal from the transmitting device in a next block of the plurality of blocks based on the LLR value for the third signal; and
 identifying a message from at least one signal in the plurality of blocks based on the LLR value for the fourth signal.

2. The method of claim 1, further comprising:
 receiving another signal comprising signals from the transmitting device and signals from the relay device in a next plurality of blocks;
 identifying an expanded graph based on trajectories of the signals from the transmitting device and signals from the relay device; and
 decoding the other signal based on the expanded graph.

3. The method of claim 2, wherein the expanded graph comprises information indicating a set of operations for decoding the at least one signal, and a sequence of the set of operations for deciding the at least one signal.

4. The method of claim 2, further comprising:
 receiving, from the transmitting device, network information; and
 determining the expanded graph based on the network information,
 wherein the network information comprises at least one of a deployment of network entities within a cell of the transmitting device, or network nodes engaged in a multi-hop communication comprising the transmitting device, the relay device, and the receiving device.

5. The method of claim 1, further comprising:
 determining the LLR value for the first signal using the signal at a node set corresponding to the receiving device and the decoding result of the second signal;
 forwarding the LLR value for the first signal to a node set corresponding to the transmitting device through a message passing;
 identifying an LLR value at the node set corresponding to the transmitting device using a sum-product algorithm (SPA); and
 forwarding, to a check node of a node set corresponding to the relay device through a message passing, the LLR value that has been identified using the sum-product algorithm.

6. The method of claim 5, further comprising:
 converting the LLR value that has been identified using the sum-product algorithm at a check node of the node set corresponding to the relay device;

determining the LLR value for the third signal at the node set corresponding to the relay device of the next block using the SPA;

forwarding the LLR value for the third signal to a node corresponding to the receiving device of the next block through a message passing; and determining the LLR value for the fourth signal at the node corresponding to the receiving device of the next block.

7. A receiving device in a wireless communication system, the receiving comprising:

a transceiver; and at least one processor operatively coupled to the transceiver, the at least one processor configured to:

receive a signal comprising a first signal from a transmitting device and a second signal from a relay device which relays signals between the transmitting device and the receiving device, in a block of a plurality of blocks, determine a log likelihood ratio (LLR) value for the first signal in the block based on the signal and a decoding result of the second signal, determine an LLR value for a third signal received by a node corresponding to the relay device in the block based on the LLR value for the first signal, determine an LLR value for a fourth signal from the transmitting device in a next block of the plurality of blocks based on the LLR value for the third signal, and identify a message from at least one signal in the plurality of blocks based on the LLR value for the fourth signal.

8. The receiving device of claim 7, wherein the at least one processor is further configured to:

receive another signal comprising signals from the transmitting device and signals from the relay device in a next plurality of blocks;

identify an expanded graph based on trajectories of the signals from the transmitting device and signals from the relay device; and decode the other signal based on the expanded graph.

9. The receiving device of claim 8, wherein the expanded graph comprises information indicating a set of operations for decoding the at least one signal, and a sequence of the set of operations for deciding the at least one signal.

10. The receiving device of claim 8, wherein the at least one processor is further configured to:

receive, from the transmitting device, network information; and determine the expanded graph based on the network information, wherein the network information comprises at least one of a deployment of network entities within a cell of the transmitting device, or network nodes engaged in a multi-hop communication comprising the transmitting device, the relay device, and the receiving device.

11. The receiving device of claim 7, wherein the at least one processor is further configured to:

determined the LLR value for the first signal using the signal at a node set corresponding to the receiving device and the decoding result of the second signal;

forward the LLR value for the first signal to a node set corresponding to the transmitting device through a message passing;

identify an LLR value at the node set corresponding to the transmitting device using a sum-product algorithm (SPA); and forward, to a check node of a node set corresponding to the relay device through a message passing, the LLR value that has been identified using the sum-product algorithm.

12. The receiving device of claim 11, wherein the at least one processor is further configured to:

convert the LLR value that has been identified using the sum-product algorithm at a check node of the node set corresponding to the relay device;

determine the LLR value for the third signal at the node set corresponding to the relay device of the next block using the SPA;

forward the LLR value for the third signal to a node corresponding to the receiving device of the next block through a message passing; and determine the LLR value for the fourth signal at the node corresponding to the receiving device of the next block.

* * * * *